(12) United States Patent
Gelbin et al.

(10) Patent No.: US 8,178,005 B2
(45) Date of Patent: May 15, 2012

(54) LIQUID PHOSPHITE COMPOSITIONS HAVING DIFFERENT ALKYL GROUPS

(75) Inventors: Michael E. Gelbin, Middlebury, CT (US); Maurice Power, Manchester (GB); Jonathan Hill, Manchester (GB)

(73) Assignee: Chemtura Corporation, Middlebury, CT (US)

( * ) Notice: Subject to any disclaimer, the term of this patent is extended or adjusted under 35 U.S.C. 154(b) by 123 days.

(21) Appl. No.: 12/534,051

(22) Filed: Jul. 31, 2009

(65) Prior Publication Data

US 2010/0025636 A1    Feb. 4, 2010

Related U.S. Application Data

(63) Continuation-in-part of application No. 11/787,531, filed on Apr. 16, 2007, now Pat. No. 7,888,414.

(60) Provisional application No. 60/815,819, filed on Jun. 20, 2006.

(51) Int. Cl.
    C09K 15/32     (2006.01)
    C08K 5/51      (2006.01)

(52) U.S. Cl. .................. 252/400.24; 524/128

(58) Field of Classification Search .............. 252/400.24
    See application file for complete search history.

(56) References Cited

U.S. PATENT DOCUMENTS

| | | | |
|---|---|---|---|
| 2,220,845 A | 11/1940 | Moyle | |
| 2,834,798 A | 5/1958 | Hechenbleikner et al. | |
| 3,412,064 A | 11/1968 | Brindell | |
| 3,492,377 A | 1/1970 | Kline | |
| 3,533,989 A | 10/1970 | Wescott, Jr. | |
| 3,558,554 A | 1/1971 | Kuriyama et al. | |
| 3,644,536 A | 2/1972 | Bafford | |
| 3,755,200 A | 8/1973 | Rhodes et al. | |
| 3,756,906 A * | 9/1973 | Leyland et al. | 524/147 |
| 3,787,537 A | 1/1974 | De Marcq | |
| 4,261,880 A | 4/1981 | Fujii et al. | |
| 4,276,233 A | 6/1981 | Markezich et al. | |
| 4,321,218 A | 3/1982 | Rasberger | |
| 4,383,950 A | 5/1983 | Rasberger | |
| 4,406,842 A | 9/1983 | Spivack | |
| 4,492,661 A | 1/1985 | Maul et al. | |
| 4,829,112 A | 5/1989 | Ishii et al. | |
| 5,208,368 A | 5/1993 | Scherzer et al. | |
| 5,254,610 A | 10/1993 | Small, Jr. et al. | |
| 5,254,709 A | 10/1993 | Hunter | |
| 5,322,871 A | 6/1994 | Pitteloud et al. | |
| 5,401,845 A | 3/1995 | Pitteloud et al. | |
| 5,532,401 A | 7/1996 | Stevenson et al. | |
| 5,561,181 A | 10/1996 | Mahood | |
| 6,576,788 B1 | 6/2003 | Penzel et al. | |
| 6,824,711 B2 | 11/2004 | Stevenson et al. | |
| 6,846,859 B2 | 1/2005 | Coffy et al. | |
| 6,887,926 B1 | 5/2005 | Parhar et al. | |
| 7,157,511 B2 | 1/2007 | Bobsein et al. | |
| 7,176,252 B2 | 2/2007 | Stevenson et al. | |
| 7,320,764 B2 | 1/2008 | Stevenson et al. | |
| 7,361,703 B2 | 4/2008 | Tikuisis et al. | |
| 7,468,410 B2 | 12/2008 | Chafin et al. | |
| 2003/0078340 A1 | 4/2003 | Fatnes et al. | |
| 2004/0048958 A1 | 3/2004 | Didier | |
| 2007/0021537 A1 | 1/2007 | Chafin et al. | |
| 2007/0149660 A1 | 6/2007 | Kumar et al. | |
| 2007/0228343 A1 | 10/2007 | Roth et al. | |
| 2010/0004363 A1 | 1/2010 | Gelbin et al. | |
| 2010/0025636 A1 | 2/2010 | Gelbin et al. | |

FOREIGN PATENT DOCUMENTS

| | | |
|---|---|---|
| CZ | 280 072 | 10/1995 |
| DE | 2940620 | 4/1981 |
| EP | 0 090 524 | 10/1983 |
| EP | 0 245 852 | 11/1987 |
| EP | 0551 062 | 7/1993 |
| GB | 1 298 248 | 11/1972 |
| GB | 2039282 * | 1/1979 |
| GB | 2 227 490 | 8/1990 |
| JP | 59 30842 | 2/1984 |
| JP | 5 202236 | 8/1993 |
| JP | 7 309884 | 11/1995 |
| RO | 112871 | 1/1998 |
| RU | 2 140 938 | 11/1999 |
| WO | 2007/149143 | 12/2007 |

OTHER PUBLICATIONS

International Search Report mailed Dec. 6, 2007; of PCT Application No. PCT/US2007/009690; 3 pgs.

International Preliminary Report on Patentability mailed Dec. 22, 2008; of PCT Application No. PCT/US2007/009690; 6 pgs.

\* cited by examiner

*Primary Examiner* — Ling Choi
*Assistant Examiner* — Hui Chin
(74) *Attorney, Agent, or Firm* — Joseph Suhadolnik

(57) ABSTRACT

A composition comprising at least two different alkylaryl phosphites, wherein some alkyl groups have a different number of carbon atoms than other alkyl groups and wherein the composition is a liquid at ambient conditions.

3 Claims, No Drawings

LIQUID PHOSPHITE COMPOSITIONS HAVING DIFFERENT ALKYL GROUPS

CROSS REFERENCE TO RELATED APPLICATIONS

This application is a continuation-in-part application of U.S. application Ser. No. 11/787,531, filed Apr. 16, 2007, which claims priority to U.S. Provisional Application No. 60/815,819, filed Jun. 20, 2006. Each of these applications is incorporated herein by reference in its entirety.

FIELD OF THE INVENTION

The present invention relates to novel phosphite compositions suitable for use as antioxidants in polymer compositions. It also relates to stabilized polymer compositions and stabilizer concentrates comprising the novel liquid phosphite compositions.

BACKGROUND OF THE INVENTION

Organic phosphites are well-known and are commonly used as secondary antioxidants in polymer compositions including, for example, polyolefins, polyvinyl chloride, and elastomers. Examples of such phosphites are disclosed in H. Zweifel (Ed) *Plastics Additives Handbook,* 5th edition, Hanser Publishers, Munich 2000. Phosphite stabilizers, both liquid and solid, are known in the art.

Solid organic phosphite stabilizers are widely used as secondary antioxidants in polymer compositions. One commercially available antioxidant is tris(2,4-di-t-butylphenyl) phosphite, shown below, a solid antioxidant commonly known as Alkanox™ 240 (Chemtura Corporation, Middlebury, Conn., USA), Irgafos™ 168 (Ciba Specialty Chemicals Corp., Tarrytown, N.Y., USA) and Doverphos™ S-480 (Dover Chemical Corp., Dover, Ohio, USA). U.S. Pat. No. 5,254,709, the entirety of which is incorporated herein by reference, describes the synthesis of tris(2,4-di-t-butylphenyl) phosphite by reacting 2,4-di-t-butyl phenol with phosphorus trichloride in the presence of catalyst. The isolated phosphite is described as a white crystalline solid having a melting point of 180-185° C.-1

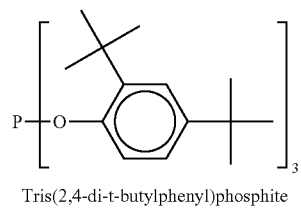

Tris(2,4-di-t-butylphenyl)phosphite

Tris(2,4-di-t-butylphenyl) phosphite has been demonstrated to effectively reduce peroxide induced oxidative degradation for many polymers including polyolefins, polycarbonates, ABS and polyesters. The trialkylaryl phosphite has low volatility that allows for its use at high temperatures commonly required for processing thermoplastic polymers. Owing to its solid form and concomitant processing limitations, however, tris(2,4-di-t-butylphenyl) phosphite is not well-suited for the stabilization of all polymers and has been demonstrated to plateout during processing of some plastics, in particular low melting point plastics, and forming deposits on processing machinery surfaces.

Liquid phosphite compositions are also well known and do not possess the handling problems associated with solid phosphite compounds. In addition, liquid phosphite compositions generally exhibit better processability than solid phosphite compositions for polymers that process at low temperatures. Tris(p-nonylphenyl) phosphite (TNPP), for example, is one alkylaryl phosphite that is a stable liquid at ambient conditions.

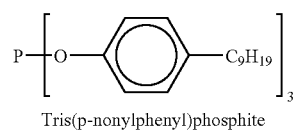

Tris(p-nonylphenyl)phosphite

TNPP is a versatile phosphite stabilizer that is useful in stabilizing a large number of polymers such as HDPE, LLDPE, SBR, ABS, PVC and others. There is, however, a need to replace TNPP owing to the alleged estrogenicity of nonylphenol, which is commonly used in the synthesis of TNPP.

Many commercially available alkylaryl phosphites share a common alkyl group. U.S. Pat. No. 5,254,709, for example, the entirety of which is incorporated herein by reference, describes the synthesis of tris(2,4-di-t-butylphenyl) phosphite by reacting a 2,4-di-t-butyl phenol with phosphorus trichloride in the presence of catalyst according to the following reaction:

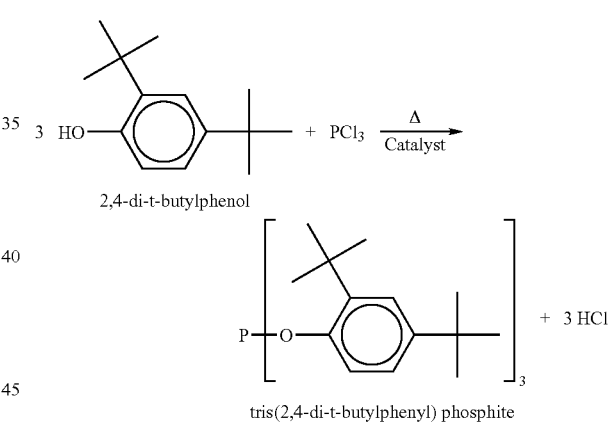

U.S. Pat. No. 7,468,410 describes a mixture of phosphites including a tri(4-sec-butylphenyl)phosphite and a tri(2-sec-butylphenyl)phosphite. Each of these phosphites is a liquid when isolated, and the combination is a liquid.

U.S. Pat. No. 5,254,709 describes various secondary antioxidants including a solid phosphite made from 2:1 molar ratio of 2,4-di-t-amyl phenol and 2,4-di-t-butyl phenol, and a liquid phosphite made from 2-t-butyl-4-nonyl phenol.

The need remains for novel, safe and effective phosphite stabilizers that can effectively stabilize polymer resins and compositions against heat and light degradation and that are liquid at ambient conditions.

SUMMARY OF THE INVENTION

The invention is directed to various compositions comprising at least two different alkylaryl phosphites, wherein some alkyl groups have a different number of carbon atoms than other alkyl groups and wherein the composition is a liquid at ambient conditions. The first and second phosphites preferably have the structure:

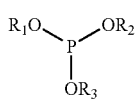

wherein $R_1$, $R_2$, and $R_3$ are independently selected alkylated aryl groups, each aryl moiety being an independently selected aromatic moiety of from 6 to 18 carbon atoms, and wherein each aromatic moiety is substituted with at least one straight or branched $C_1$-$C_{18}$ alkyl group. $R_1$, $R_2$, and $R_3$ preferably are independently selected alkylated aryl groups of the structure:

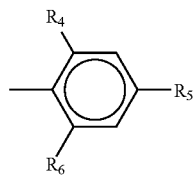

wherein $R_4$, $R_5$, and $R_6$ are independently selected from the group consisting of hydrogen and straight or branched $C_1$-$C_8$ alkyl provided that at least one of $R_4$, $R_5$, and $R_6$ is not hydrogen.

In a first embodiment, the composition comprises a first phosphite of the structure:

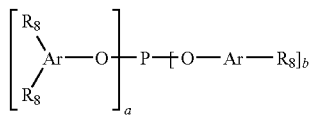

and a second phosphite of the structure

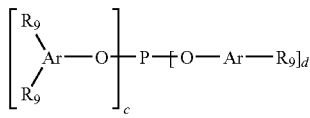

wherein a, b, c, and d are independently integers selected from 0, 1, 2, and 3, provided that a+b=3 and c+d=3, wherein each Ar is an independently selected aromatic moiety, and wherein each $R_8$ is an alkyl group having the same number of carbon atoms, and each $R_9$ is an alkyl group having the same number of carbon atoms, provided that $R_9$ has a different number of carbon atoms than $R_8$. $R_8$ and $R_9$ preferably are independently selected straight or branched $C_1$-$C_{18}$ alkyl groups, and most preferably are selected from propyl, t-butyl, and t-amyl.

In this embodiment, the two or more phosphites preferably include a first phosphite selected from the group consisting of tris(2,4-di-t-butylphenyl)phosphite, tris(4-t-butylphenyl) phosphite, bis(2,4-di-t-butylphenyl)-4-t-butylphenyl phosphite, and bis(4-t-butylphenyl)-2,4-di-t-butylphenyl phosphite and a second phosphite selected from the group consisting of tris(2,4-di-t-amylphenyl)phosphite, tris(4-t-amylphenyl)phosphite, bis(2,4-di-t-amylphenyl)-4-t-amylphenyl phosphite, and bis(4-t-amylphenyl)-2,4-di-t-amylphenyl phosphite.

In a second embodiment, the phosphite composition comprises one or more phosphites having the structure:

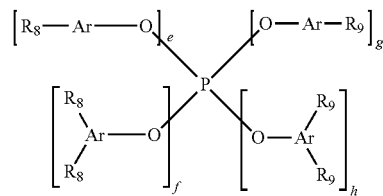

wherein e, f, g and h are independently selected from 0, 1 and 2, provided that e+f+g+h=3, e+f=1 or 2, and g+h=1 or 2, wherein each Ar is an independently selected aromatic moiety, and wherein each $R_8$ is an alkyl group having the same number of carbon atoms and each $R_9$ is an alkyl group having the same number of carbon atoms, provided that $R_8$ has a different number of carbon atoms than $R_9$.

In a third embodiment, the phosphite composition comprises one or more phosphites having the structure:

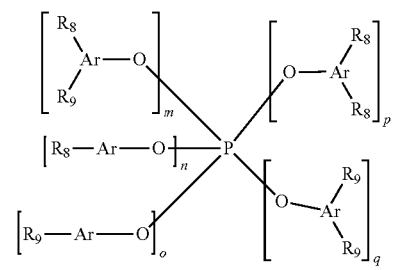

wherein m is an integer selected from 1, 2 and 3; n, o, p and q are integers independently selected from 0, 1 and 2, provided that m+n+o+p+q=3, wherein each Ar is an independently selected aromatic moiety, and wherein each $R_8$ is an alkyl group having the same number of carbon atoms and each $R_9$ is an alkyl group having the same number of carbon atoms, provided that $R_8$ has a different number of carbon atoms than $R_9$.

In each aspect of the invention, $R_8$ and $R_9$ are independently selected from straight or branched $C_1$-$C_{12}$ alkyl groups, preferably selected from isopropyl, t-butyl and t-amyl.

In another embodiment, the invention is to a composition comprising at least two different alkylaryl phosphites, wherein at least one of the alkylaryl phosphites has two or more alkyl groups having a different number of carbon atoms on different aryl moieties, and wherein the composition is a liquid at ambient conditions. The different alkylaryl phosphites optionally is a reaction product of a phosphorous trihalide and a mixture of 2,4-di-t-amyl phenol and 4-t-butyl phenol, in a molar ratio of 1:4 to 4:1. In another aspect, the two different alkylaryl phosphites is a reaction product of a phosphorous trihalide and a mixture of 4-t-butyl phenol and either 4-t-amyl phenol or 2,4-di-t-amyl phenol, in a molar ratio of 1:4 to 4:1. In another embodiment, the two different alkylaryl phosphites is a reaction product of a phosphorous trihalide and a mixture of 4-t-amyl phenol and either 4-t-butyl phenol or 2,4-di-t-butyl phenol, in a molar ratio of 1:4 to 4:1.

In another embodiment, the invention is to a phosphite composition comprising at least two different alkylaryl phosphites, wherein at least one of the alkylaryl phosphites has at least one aryl moiety with two or more alkyl groups having a different number of carbon atoms, and wherein the composition is a liquid at ambient conditions.

DETAILED DESCRIPTION OF THE INVENTION

Introduction

The present invention relates to phosphite compositions comprising at least two different alkylaryl phosphites provided that the phosphite composition includes two or more alkyl groups, whether on the same or different phosphite compounds, the two or more alkyl groups having a different number of carbon atoms. The inclusion of two or more alkyl groups having a different number of carbon atoms leads to primarily to three different embodiments of the present invention as follows:

(i) Mixed Phosphite Embodiment. In the first embodiment, the two or more alkyl groups having a different number of carbon atoms are on different phosphite compounds. One phosphite has an alkyl group having a first number of carbon atoms and another phosphite has an alkyl group having a second number of carbon atoms, where the first and second numbers are different. The first embodiment is referred to as the "mixed phosphites" embodiment because such compositions may be formed by mixing two separately synthesized phosphites.

(ii) Mixed Alkylate Embodiment. In a second embodiment, the two or more alkyl groups having a different number of carbon atoms are on adjacent aryl moieties of specific phosphite compounds. Each phosphite has three aryl moieties and one of the aryl moieties is substituted with an alkyl group having the first number of carbon atoms and an adjacent aryl moiety is substituted with an alkyl group having a second number of carbon atoms, where the first and second numbers are different. The second embodiment is referred to as "mixed alkylates" embodiment because such phosphite compositions may be formed by reacting an alkylate composition with a phosphorous halide, where the alkylate composition comprises a composition of at least two separately synthesized alkylates.

(iii) Mixed Olefins Embodiment. In a third embodiment, the two or more alkyl groups having a different number of carbon atoms are both on the same aryl moiety of one or more phosphites. The third embodiment is referred to as "mixed olefins" embodiment because such compositions may be formed by mixing olefins having a different number of carbon atoms, reacting the mixed olefins with a hydroxyaryl compound to form an alkylate composition, and reacting the alkylate composition with a phosphorous halide.

It should be appreciated that two or more of the first, second and third embodiments may be combined to form even more diverse phosphite compositions.

Phosphite Compositions

While the various embodiments of the present invention will lead to different phosphite compositions, there generally are some shared characteristics for these different phosphite compositions. In preferred embodiments, the phosphite compositions are liquid at ambient conditions. By "ambient conditions" it is meant room temperature, e.g., 25° C., and 1 atmosphere pressure. As discussed herein, in each of the embodiments of the present invention the fact that the phosphite compositions are liquid at ambient conditions is surprising and unexpected because it would be expected that each of the different phosphites contained in the phosphite composition, when isolated, would be a solid at ambient conditions. This is particularly surprising given that the prior art teaches several examples of solid phosphite compositions, the components of which are separately solids at ambient condition, (See JP 59030842; WO 9303092; CA 2,464,551; U.S. Pat. No. 5,254,709). In contrast, the phosphite compositions of the invention are liquid even though the individual components would be expected to be solid.

As noted above, the phosphite compositions of the invention are liquids at ambient conditions even though at least some of the individual components, when isolated, are solid at ambient conditions. Table 1, for example, provides the melting points, each of which is above room temperature, for several pure phosphite compounds.

TABLE 1

| Phosphite | Melting Point |
|---|---|
| tris(4-t-butylphenyl) phosphite | 75-76° C. |
| tris(2,4-di-tertbutylphenyl) phosphite | 181-184° C. |
| bis(4-t-butylphenyl)-2,4-di-t-butylphenyl phosphite | 63-65° C. |
| bis (2,4-di-t-butylphenyl)-4-t-butylphenyl phosphite | 100-103° C. |
| tris(4-t-amylphenyl) phosphite | 52-54° C. |
| tris(2,4-di-t-amylphenyl) phosphite | 103° C. |

As indicated above, the phosphite compositions of the invention are liquids at ambient conditions. As used herein, by "liquid," it is meant that the phosphite composition remains liquid after at least three "freeze/thaw" cycles as opposed to "meta-stable liquids," which do not remain liquid after three or fewer cycles. A freeze/thaw cycle is defined as follows: 1) An ambient temperature composition is stirred for 0.5 hours; 2) The stirred composition is then refrigerated at about 5° C. for three days; and 3) The refrigerated composition is then brought to ambient temperature, and held at ambient for 3 days. Upon completion of step 3, the composition is checked for solids content, e.g., crystallization. Completion of steps 1-3 defines one freeze/thaw cycle.

The viscosity of the phosphite composition may vary depending on the relative amounts of the various phosphite compounds contained therein. In some exemplary embodiments, the phosphite composition has a viscosity less than 11,000 cSt, e.g., less than 7,300 cSt, less than 5,000 cSt, less than 3,000 cSt, or less than 2850 cSt, these viscosities being measured at 30° C. In terms of ranges, viscosity of the composition may range from 1 cSt to 15,000 cSt, from 100 cSt to 12,000 cSt, from 500 cSt to 10,000 cSt, from 500 cSt to 6,500 cSt, from 500 cSt to 5,000 cSt, from 500 cSt to 3,000 cSt, from 1,000 cSt to 4,000 cSt, from 1,500 cSt to 3,500 cSt, from 2,000 cSt to 3,000 cSt, or from 2,000 to 2,800 cSt, these viscosities being measured at 30° C.

It has now been discovered that by increasing the diversity of the alkylaryl phosphites in the phosphite composition, handling characteristics (e.g., liquid physical state and viscosity) as well as solubility/compatibility with various polymers can be advantageously improved. The embodiments of the invention provide various ways to increase phosphite diversity by incorporating alkyl groups having different numbers of carbon atoms. In various optional embodiments, for example, the liquid composition may comprise at least 2, e.g., at least 4 or at least 10, different alkylaryl phosphites, and optionally from 2 to 100 different alkylaryl phosphites, e.g., from 3 to 20 different alkylaryl phosphites or from 4 to 10 different alkylaryl phosphites.

Another advantage of embodiments of the present invention is that alkylaryl phosphites derived from mixed alkylates helps to mitigate processing costs due to fluctuations in source alkenes and by eliminating the conventional need for substantially pure starting materials (e.g., olefins and/or alkylated phenolics).

Generally, each phosphite in the composition has the structure:

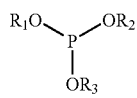
(I)

wherein $R_1$, $R_2$, and $R_3$ are independently selected alkylaryl groups and wherein the composition is a liquid at ambient conditions.

The aryl moiety (Ar) present in the compounds of the present invention is preferably an aromatic moiety of from 6 to 18 carbon atoms, e.g., phenyl, naphthyl, phenanthryl, anthracyl, biphenyl, terphenyl, o-cresyl, m-cresyl, p-cresyl, xylenols and the like, preferably phenolics such as phenyl.

As indicated above, the phosphite composition comprises at least two phosphite compounds. The phosphite composition also preferably contains at least two alkyl groups having a different number of carbon atoms. Generally, each aromatic moiety is substituted with at least one branched or straight chain $C_1$-$C_{18}$ alkyl group, e.g., $C_4$-$C_{10}$ alkyl group or $C_4$-$C_5$ alkyl group, preferably t-butyl and/or t-amyl, but preferably no aromatic moieties are substituted with any $C_9$ alkyl groups. In one embodiment, the two or more alkyl groups having a different number of carbon atoms are selected from branched or straight chain $C_1$-$C_{12}$ alkyl group, e.g., a $C_2$-$C_5$ alkyl group, a $C_2$-$C_4$ alkyl group, or $C_3$-$C_5$ alkyl group, provided that one alkyl group has a different number of carbon atoms than the another alkyl group. The alkyl groups may be selected, for example, from the group consisting of methyl, ethyl, propyl, butyl, amyl, hexyl, heptyl, octyl, nonyl (although less preferred), decyl, undecyl, dodecyl, tridecyl, tetradecyl, pentadecyl, hexadecyl, heptadecyl, octadecyl, and isomers thereof. Most preferably, the alkyl group(s) are selected from propyl, especially isopropyl, butyl, especially sec-butyl, t-butyl, and amyl groups, especially sec-amyl, t-amyl and neo-amyl. Preferably, neither of the alkyl groups having different numbers of carbon atoms is $C_8$-$C_{10}$ alkyl, e.g., $C_9$ alkyl. Thus, in a preferred embodiment, the alkyl moieties do not include nonyl, meaning the phosphite composition preferably comprises less than 50 wppm, e.g., less than 10 wppm or less than 5 wppm nonyl substituted aryl phosphite compounds, and most preferably no detectable nonyl substituted aryl phosphite compounds. In addition, the phosphite composition preferably comprises less than 50 wppm, e.g., less than 10 wppm or less than 5 wppm nonylphenol, and most preferably no detectable nonylphenol.

The aromatic moieties may be mono, di or tri substituted in the ortho and/or para positions, but preferably the phosphites themselves are not exclusively mono substituted and are not exclusively disubstituted. Instead, the phosphite compositions of the invention ideally include phosphite compounds having aryl moieties that are monoalkylated and dialkylated. The combination of mono and di-substituted aryl moieties in combination with employing different alkyl groups advantageously may lead to very diverse phosphite compositions. Ideally, few if any of the aryl moieties are trisubstituted. For example, in some embodiments fewer than 3 wt. % of the aryl moieties are trisubstituted, e.g., fewer than 2 wt. %, or fewer than 1 wt. %.

Similarly, it is preferred that few if any of the aryl moieties are monosubstituted in the ortho position. Preferably, the aryl moieties are monosubstituted in the ortho position, if at all, in an amount less than 3 wt. %, e.g., less than 2 wt. % or less than 1 wt.

In one embodiment, the phosphite composition is substantially free of phosphite compounds having aryl groups that are substituted with alkyl groups having hydrogen atoms in the α position. That is, in preferred embodiments, at least 95%, at least 98% or at least 99% of the aryl moieties are substituted with alkyl groups having tertiary α-carbons, most preferably t-butyl and/or t-amyl.

In one embodiment, $R_1$, $R_2$, and $R_3$ are independently selected alkylated aryl groups of the structure:

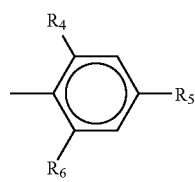
(II)

wherein $R_4$, $R_5$, and $R_6$ are independently selected from the group consisting of hydrogen and straight or branched $C_1$-$C_8$ alkyl, e.g., methyl, ethyl, propyl, butyl, amyl, hexyl, heptyl, octyl, and isomers thereof, e.g., isopropyl, t-butyl, t-amyl, neo-amyl, provided that at least one of $R_4$, $R_5$, and $R_6$ is not hydrogen. In one embodiment $R_4$ and $R_6$ are hydrogen, and $R_5$ is not hydrogen. In one embodiment, the ortho alkyl groups, i.e., $R_4$ and $R_6$, have no α-hydrogen atoms. In one embodiment, the ortho alkyl groups, i.e., $R_4$ and $R_6$, have tertiary α-carbon atoms selected from the group consisting of t-butyl and t-amyl.

In one embodiment, $R_4$ and $R_5$ are independently selected from the group consisting of methyl, ethyl, propyl, butyl, amyl, hexyl, and isomers thereof, and $R_6$ is hydrogen. In another embodiment, $R_4$ and $R_6$ are hydrogen and $R_5$ is independently selected from the group consisting of methyl, ethyl, propyl, butyl, amyl, hexyl, and isomers thereof. In one aspect of these embodiments, at least one of $R_4$, $R_5$, and $R_6$ are $C_4$ or $C_5$ alkyl, most preferably t-butyl or t-amyl.

In one embodiment, $R_1$, $R_2$, and $R_3$ are independently selected alkylated aryl groups of the structure:

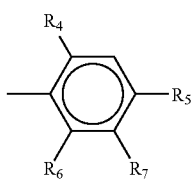
(III)

wherein $R_4$, $R_5$, and $R_6$ are defined above and $R_7$ is hydrogen or methyl, provided that one of $R_4$, $R_5$, $R_6$, and $R_7$ is methyl and that at least two of $R_4$, $R_5$, $R_6$, and $R_7$ are not hydrogen (e.g., at least two of $R_4$, $R_5$, $R_6$, and $R_7$ are straight or branched $C_1$-$C_8$ alkyl). Such phosphites may be formed, for example, by the reaction of one or more alkylated cresol compounds, e.g., one or more of alkylated ortho-, meta- and/or para-cresol, with $PCl_3$, as discussed in greater detail below.

In some embodiments, the phosphite compositions have an overall phosphorus content that is equal to or greater than TNPP, e.g., at least 4.5 mole %, e.g., at least 4.8 mole %, or at least 5.1 mole %. In terms of ranges, the overall phosphorus content of the phosphite composition may range from 4.5 to 10.0 mole %, e.g., from 4.8 to 8.0 mole %, or 5.1 to 6.0 mole %, of all phosphorous containing compounds in the phosphite composition.

Preferably, the phosphite composition has a low level or is substantially free of phenolics (e.g., phenols, cresols or xylenols), whether alkylated or unalkylated, which is referred to herein as "free phenolics" when contained in the phosphite composition. In terms of amounts, the phosphite composition preferably comprises less than 5 wt. %, e.g., less than 3 wt. % or less than 1 wt. %, of free phenolics, based on the total weight of the phosphite composition. Any free phenolics, for example, may be removed by distillation. Extremely low levels of free phenolics may be achieved, for example, by employing a wiped-film molecular (Short-Path) still, wiped film evaporator (WFE), thin film evaporator, or similar equipment. In terms of amounts, the phosphite composition may comprise less than 0.5 wt. %, e.g., less than 0.2 wt. % or less than 0.1 wt. %, of free phenolics, based on the total weight of the phosphite composition.

In other embodiments, a minor amount of free phenolics may be beneficial, for example, as a viscosity reducing agent. Thus, in one embodiment, the phosphite composition comprises a minor amount of free phenolics, e.g., from 1 to 4 weight percent, e.g., from 2 to 3 weight percent, based on the total weight of the phosphite composition.

In addition, the phosphite composition is preferably substantially free of phosphite compounds having unsubstituted aryl moieties, e.g., triphenylphosphites, bis(phenyl)alkylphenyl phosphites or bis(alkylphenyl)phenyl phosphites. In terms of amounts, the phosphite composition preferably comprises less than 2 wt. %, e.g., less than 1 wt. % or less than 0.5 wt. %, phosphite compounds having at least one unsubstituted aryl moiety, based on the total weight of the phosphite composition. Alternatively, the alkylate used to prepare the phosphite composition may contain a minor amount of phenol, e.g., from 5 to 10 weight percent phenol, which may react during the phosphite synthesis process to form some phenyl phosphites.

In some preferred embodiments, the phosphite composition (whether of the first, second, or third embodiment) includes one or more hydrolytic stabilizers. Preferred stabilizers include amines of the structure:

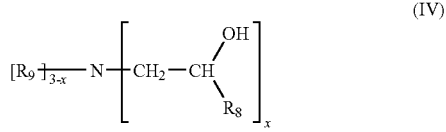

(IV)

wherein x is 1, 2 or 3; $R_8$ is selected from the group consisting of hydrogen, and straight or branched $C_1$-$C_6$ alkyl, and $R_9$ is selected from the group consisting of straight or branched $C_1$-$C_{30}$ alkyl. Preferably $R_8$ is selected from the group consisting of straight or branched $C_1$-$C_4$ alkyl, e.g., methyl or ethyl. Preferably $R_9$ is selected from the group consisting of straight or branched $C_5$-$C_{20}$ alkyl, e.g., straight or branched $C_{10}$-$C_{20}$ alkyl or straight or branched $C_{12}$-$C_{18}$ alkyl. In one embodiment, x is 1 and $R_9$ is straight or branched $C_5$-$C_{20}$ alkyl, e.g., $C_{12}$-$C_{18}$ alkyl. In one embodiment, x is 2 and $R_9$ is straight or branched $C_{10}$-$C_{20}$ alkyl, e.g., $C_{12}$-$C_{18}$ alkyl.

In one aspect the amine is selected from the group consisting of triethanolamine, triisopropanolamine, diethanolamine, diisopropanolamine, and tetraisopropanolethylenediamine.

In another aspect the amine is selected from the group consisting of octyl-bis(2-ethanol)amine, nonyl-bis(2-ethanol)amine, decyl-bis(2-ethanol)amine, undecyl-bis(2-ethanol)amine, dodecyl-bis(2-ethanol)amine, tridecyl-bis(2-ethanol)amine, tetradecyl-bis(2-ethanol)amine, pentadecyl-bis(2-ethanol)amine, hexadecyl-bis(2-ethanol)amine, heptadecyl-bis(2-ethanol)amine, octadecyl-bis(2-ethanol)amine, octyl-bis(2-propanol)amine, nonyl-bis(2-propanol)amine, decyl-bis(2-propanol)amine, undecyl-bis(2-propanol)amine, dodecyl-bis(2-propanol)amine, tridecyl-bis(2-propanol)amine, tetradecyl-bis(2-propanol)amine, pentadecyl-bis(2-propanol)amine, hexadecyl-bis(2-propanol)amine, heptadecyl-bis(2-propanol)amine, octadecyl-bis(2-propanol)amine, and isomers thereof. Commercially available amines include Armostat™ 300 and Armostat 1800 manufactured by Akzo Nobel Polymers.

Additional hydrolytic stabilizers include epoxies such as epoxidized soybean oil (ESBO) commercially available as Drapex™ 39, Drapex 392, Drapex 4.4, and Drapex 6.8 (Chemtura Corp.).

The amine may be present in an amount of from 0.01 to 5 wt. %, e.g., from 0.1 to 1.5 wt. % or from 0.2 to 0.8 wt. %, based on the total weight of the phosphite composition.

The various embodiments of the present invention will now be separately described in more detail below.

Mixed Phosphites Embodiment

In the first embodiment, the present invention relates to liquid phosphite compositions having at least two different alkylaryl phosphites. Specifically, the phosphite compositions comprise one or more first phosphites having exclusively first alkyl groups and one or more second phosphites having exclusively second alkyl groups, wherein the first alkyl groups have a different number of carbon atoms than the second alkyl groups. The phosphite compositions comprise phosphites having at least the following two structures:

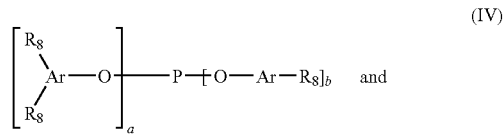

(IV)

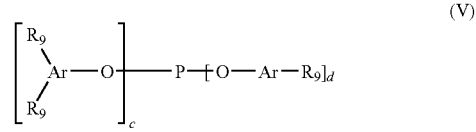

(V)

wherein a, b, c, and d are independently integers selected from 0, 1, 2, and 3, provided that a+b=3 and c+d=3. Each Ar is independently selected from the aromatic moieties defined above. Preferably, each Ar is a phenolic, more preferably phenyl. Each $R_8$ is an alkyl group having the same number of carbon atoms and each $R_9$ is an alkyl group having the same number of carbon atoms, provided that $R_8$ has a different number of carbon atoms than $R_9$. Thus, $R_8$ and $R_9$ preferably are independently selected from straight or branched $C_1$-$C_{18}$ alkyl, e.g., $C_1$-$C_{12}$, $C_2$-$C_5$ or $C_2$-$C_4$ alkyl, provided that that $R_8$ has a different number of carbon atoms than $R_9$. In one embodiment, one of $R_8$ or $R_9$ is $C_4$ alkyl, e.g., t-butyl, and the other of $R_8$ or $R_9$ is $C_5$ alkyl, e.g., t-amyl.

In one embodiment of the present invention, the phosphite composition comprises at least a first phosphite and a second phosphite, wherein the first phosphite comprises an Alkyl-A group and the second phosphite comprises an Alkyl-B group. As used herein, "Alkyl-A" refers to an alkyl group having A carbon atoms and "Alkyl-B" refers to an alkyl group having B carbon atoms, wherein B is a whole number greater than A. For example, Alkyl-A may be t-butyl, and Alkyl-B may be t-amyl. Thus, the first phosphite will be substituted with alkyl groups that have fewer carbon atoms that the second phosphite. It should be noted that each of Alkyl-A and Alkyl-B may include multiple isomers of alkyl groups having the same number of carbon atoms. For example, Alkyl-A groups may include sec-butyl and t-butyl, and Alkyl-B groups may include sec-amyl and t-amyl.

For example, the first phosphite may be selected from the group consisting of: tris(Alkyl-A-aryl) phosphite, tris(di-Alkyl-A-aryl)phosphite, bis(Alkyl-A-aryl)di-Alkyl-A-aryl phosphite, and bis(di-Alkyl-A-aryl)Alkyl-A-aryl phosphite. The second phosphite may be selected from the group consisting of: tris(Alkyl-B-aryl) phosphite, tris(di-Alkyl-B-aryl) phosphite, bis(Alkyl-B-aryl)di-Alkyl-B-aryl phosphite, and bis(di-Alkyl-B-aryl)Alkyl-B-aryl phosphite. Preferably, the phosphite composition comprises at least three, e.g., at least four or at least five, of the phosphites identified above.

The relative amounts of the first and second phosphites in the phosphite composition may vary so long as the phosphite composition is a liquid at ambient conditions. In one embodiment, the molar ratio of Alkyl-A groups to Alkyl-B groups, or alternatively of the first phosphite(s) to the second phosphite(s), is from 1:10 to 10:1, e.g., from 1:4 to 4:1 or from 2:1 to 1:1. In a preferred embodiment, the phosphite composition comprises the phosphite having alkyl groups with the lesser number of carbon atoms, i.e., the first phosphite, in an amount greater than the phosphite having alkyl groups with the greater number of carbon atoms, i.e., the second phosphite. For example, if the first phosphite is substituted with t-butyl groups and the second phosphite is substituted with t-amyl groups, the phosphite composition preferably comprises the first phosphite in an amount greater than the second phosphite. By including a greater amount of the first phosphite than the second phosphite, the overall phosphorus content may be advantageously maximized. In addition, the second phosphite in the phosphite composition, preferably in a minor amount, may improve, e.g., lower, the viscosity and processing characteristics for the overall phosphite composition.

In some embodiments, for example, the phosphite composition comprises the first phosphite (containing Alkyl-A groups) in an amount greater than 50 weight percent, greater than 60 weight percent or greater than 75 weight percent, based on the total weight of all phosphites in the phosphite composition, and preferably comprises the second phosphite (containing Alkyl-B groups) in an amount greater than 5 weight percent, greater than 10 weight percent or greater than 25 weight percent, based on the total weight of all phosphites in the phosphite composition. In terms of ranges, the phosphite composition preferably comprises the first phosphite in an amount from 50 to 90 weight percent, e.g., in an amount from 60 to 90 weight percent or in an amount from 75 to 90 weight percent, and the second phosphite in an amount from 10 to 50 weight percent, e.g., from 10 to 40 weight percent or from 10 to 25 weight percent, based on the weight of all phosphites in the phosphite composition.

In other embodiments, the phosphite composition comprises the phosphite having the alkyl groups with the lesser number of carbon atoms in an amount less than the phosphite having the alkyl groups with the greater number of carbon atoms. In this embodiment, the phosphite composition optionally comprises the second phosphite in an amount from 50 to 90 weight percent, e.g., in an amount from 60 to 90 weight percent or in an amount from 75 to 90 weight percent, and the first phosphite in an amount from 10 to 50 weight percent, e.g., from 10 to 40 weight percent or from 10 to 25 weight percent, based on the weight of all phosphites in the phosphite composition.

In one preferred embodiment, the first phosphite is substituted with propyl groups, e.g., isopropyl groups, and the second phosphite is substituted with butyl groups, e.g., t-butyl groups. In another preferred embodiment, the first phosphite is substituted with propyl groups, e.g., isopropyl groups, and the second phosphite is substituted with amyl groups, e.g., t-amyl groups. In still another preferred embodiment, the first phosphite is substituted with butyl groups, e.g., t-butyl groups, and the second phosphite is substituted with amyl groups, e.g., t-amyl groups.

Thus, in one embodiment, Alkyl-A is isopropyl and Alkyl-B is t-butyl. In this aspect, the first phosphite is selected from the group consisting of tris(4-isopropyl phenyl) phosphite, tris(2,4-dipropylphenyl) phosphite, bis(4-propylphenyl)-2,4-dipropylphenyl phosphite, and bis(2,4-di-isopropylphenyl)-4-isopropylphenyl phosphite. In this aspect, the second phosphite is selected from the group consisting of tris(4-t-butylphenyl) phosphite, tris(2,4-di-t-butylphenyl) phosphite, bis(4-t-butylphenyl)-2,4-di-t-butylphenyl phosphite, and bis(2,4-di-t-butylphenyl)-4-t-butylphenyl phosphite.

In another embodiment, Alkyl-A is isopropyl and Alkyl-B is t-amyl. In this aspect, the first phosphite is selected from the group consisting of tris(4-isopropyl phenyl) phosphite, tris(2,4-di-isopropyl phenyl) phosphite, bis(4-isopropyl phenyl)-2,4-di-isopropyl phenyl phosphite, and bis(2,4-di-isopropyl phenyl)-4-isopropyl phenyl phosphite, and the second phosphite is selected from the group consisting of tris(4-t-amylphenyl) phosphite, tris(2,4-di-t-amylphenyl) phosphite, bis(4-t-amylphenyl)-2,4-di-t-amylphenyl phosphite, and bis (2,4-di-t-amylphenyl)-4-t-amylphenyl phosphite.

In a particularly preferred embodiment, tertiary olefins such as t-butyl and t-amyl are employed in combination where the aryl moiety is a phenolic, e.g., phenyl. For example, the phosphite composition may comprise a first phosphite and a second phosphite where the first phosphite is selected from the group consisting of tris(4-t-butylphenyl) phosphite, tris (2,4-di-t-butylphenyl) phosphite, bis(4-t-butylphenyl)-2,4-di-t-butylphenyl phosphite, and bis(2,4-di-t-butylphenyl)-4-t-butylphenyl phosphite. In this aspect, the second phosphite is selected from the group consisting of tris(4-t-amylphenyl) phosphite, tris(2,4-di-t-amylphenyl) phosphite, bis(4-t-amylphenyl)-2,4-di-t-amylphenyl phosphite, and bis(2,4-di-t-amylphenyl)-4-t-amylphenyl phosphite.

In some embodiments, the phosphite composition comprises at least three, e.g., at least four or at least five, of the phosphites identified above.

Because of the presence of multiple phosphite compounds, the phosphite compositions of this embodiment may be particularly diverse so long as the overall phosphite composition is a liquid at ambient conditions. In some exemplary embodiments, the phosphite composition optionally comprises tris (monoalkylaryl)phosphites, e.g., tris(Alkyl-A-phenyl) phosphite and tris(Alkyl-B-phenyl) phosphite, in an amount from 20 to 70 weight percent, e.g., from 15 to 55 weight percent, or from 37 to 54 weight percent, based on the total weight of all phosphites in the phosphite composition. The phosphite composition optionally comprises bis(monoalkylaryl)dialkylaryl phosphites, e.g., bis(Alkyl-A-phenyl)di-Alkyl-A-phenyl phosphite, and bis(Alkyl-B-phenyl)di-Alkyl-B-phenyl phosphite, in an amount from 15 to 60 weight percent, e.g., from 31 to 50 weight percent, or from 34 to 45 weight percent, based on the total weight of all phosphites in the phosphite composition. The phosphite composition optionally further comprises tris(dialkylaryl) phosphites and/or bis(dialkylaryl) monoalkylaryl phosphites. If present, the phosphite composition preferably comprises bis(dialkylaryl)monoalkylaryl phosphites, e.g., bis(di-Alkyl-A-phenyl)Alkyl-A-phenyl phosphite and bis(di-Alkyl-B-phenyl)Alkyl-B-phenyl phosphite, in an amount of from 2 to 20 weight percent, e.g., from 4 to 20 weight percent or from 5 to 10 weight percent, based on the total weight of all phosphites in the phosphite composition. If present, the phosphite composition preferably comprises tris(dialkylaryl) phosphites, e.g., tris(di-Alkyl-A-phenyl) phosphite and/or tris(di-Alkyl-B-phenyl) phosphite in an amount from 0.1 to 20 weight percent, e.g., from 0.3 to 5 weight percent or from 0.5 to 1 weight percent, based on the total weight of all phosphites in the phosphite composition.

The process for forming the phosphite compositions of the first embodiment comprises separately making each phosphite and blending the separate phosphites together. Preferably the first phosphite is formed from the reaction of a phosphorous trihalide with a first alkylate composition, which in turn is formed from the reaction between a hydroxyaryl compound and a first olefin. Similarly, the second phosphite is formed from the reaction of a phosphorous trihalide with a second alkylate composition, which in turn is formed from the reaction between a hydroxyaryl compound and a second olefin, wherein the second olefin has a different number of carbon atoms than the first olefin.

In the phosphite synthesis reaction, phosphite compositions are obtained in a direct chemical reaction. A schematic of one reaction method that may be employed to form such phosphite compositions is as follows. As indicated above, the first phosphite and the second phosphite are separately synthesized according to the below process.

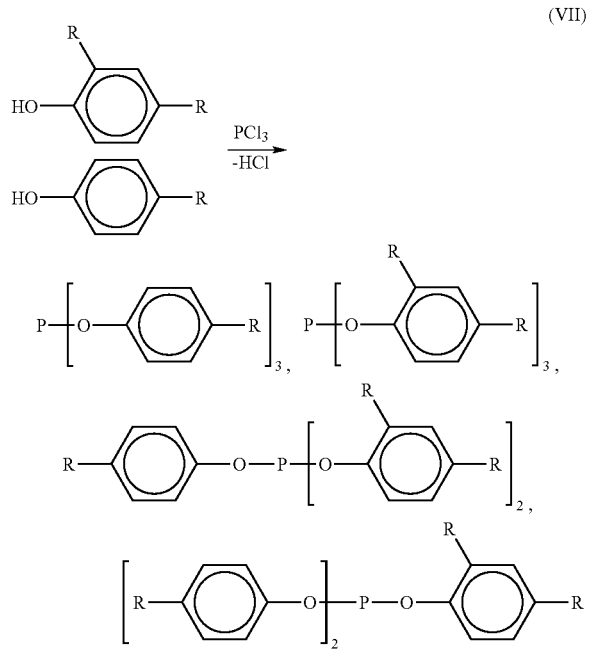

(VII)

wherein R is independently any of the groups as defined above (e.g., $R_8$ or $R_9$, respectively). Note that a minor amount of other alkylated phenols, e.g., ortho-substituted monoalkylated phenols, may be included as an additional reactant in the above reaction scheme and would form additional derivative phosphites, but these additional reactants and products have been omitted from this reaction for clarity.

The phosphorus trihalide preferably is selected from phosphorus trichloride and phosphorus tribromide. When a catalyst is used, the catalyst may be selected from the group consisting of pyridine, N,N-dimethyldodecylamine, and dilauryl methyl amine or their hydrochloride salts. The molar ratio of alkylate composition (i.e., alkylated phenol compounds) to phosphorus trihalide preferably is from 3:1 to 5:1, e.g., from 3:1 to 4:1 or from 3.1 to 3.7:1.

The reaction of the alkylated phenols with a phosphorus trihalide may be conducted under an inert atmosphere (e.g., nitrogen) at a temperature of from 5 to 70° C., e.g., from 40 to 70° C. or from 50 to 70° C. Preferably, the temperature is held at or below 70° C. during the addition of the alkylate composition to prevent refluxing the phosphorus trihalide. Optionally, the alkylate composition is charged to the reactor and the phosphorus trihalide is added thereto. After the addition of alkylate composition, the temperature is optionally held for 10 minutes to 12 hours, e.g., from 30 minutes to 10 hours, or from 1 hour to 3 hours. The reaction preferably is conducted at a pressure of 0.8 to 4 atm, e.g., from 0.9 to 3 atm or from 1 to 2 atm. Next, the temperature may be ramped a ramped temperature ranging from 70° C. to 250° C., e.g., from 80° C. to 225° C. or from 90° C. to 200° C. Preferably, the reaction is held at the ramped temperature for from 10 minutes to 12 hours, e.g., from 30 minutes to 10 hours, or from 1 hour to 3 hours. The reaction preferably is conducted at a reduced pressure of 0.01 to 0.5 atm, e.g. from 0.03 to 0.4 atm or from 0.04 to 0.1 atm. During the reaction time, hydrochloric or hydrobromic gas will be evolved, and may be removed by reducing the pressure to about 0.05 atm or sweeping an inert gas such as nitrogen over the reaction mixture. In one aspect the removal of such gases may be performed until the total chloride content in the reaction mixture is less than 50 wppm, e.g., less than 25 wppm or less than 10 wppm.

In one aspect of the process, any free phenol that is not reacted with the phosphorus trihalide may be liberated by raising the reaction temperature to up to 275° C., e.g., up to 250° C. or up to 225° C., or up to 200° C., and in a vacuum at a pressure of 0.0001 to 0.1 atm. In one embodiment, a wiped-film molecular (Short-Path) still, wiped film evaporator (WFE), thin film evaporator, or similar equipment may be used to further remove the free cresol or phenol to the very low levels indicated above.

In one embodiment, the step of forming the phosphite composition may occur in one or more neutral solvents. Typical solvents that may be employed include toluene, xylene, methylene chloride, heptane, chloroform, and benzene.

Since the invention of this embodiment comprises two different phosphites having different alkyl groups, one or more of the products shown above in scheme (VII), optionally may be separated or partially separated (e.g., through distillation) from the other reaction products. In this aspect, two relatively pure phosphites may be optionally heated and blended to form a mixture of phosphite compounds, each having a different alkyl groups. For example, the phosphite composition may comprise a first phosphite comprising a substantially pure mono substituted aryl phosphite that is alkylated with Alkyl-A, and a second phosphite comprising a substantially pure disubstituted aryl phosphite that is dialkylated with Alkyl-B. Liquid phosphite compositions may be formed from such first and second phosphite compounds when combined in the proper ratios, as described above. In other embodiments the first phosphite includes several compounds that are alkylated with Alkyl-A (e.g., any of those shown in scheme (VII) above) and/or the second phosphite includes several compounds that are alkylated with Alkyl-B.

Mixed Alkylates Embodiment

In the second embodiment, the invention is to liquid alkylaryl phosphite compositions comprising two or more phosphite compounds, wherein at least some of the phosphite compounds are substituted with multiple alkyl groups including at least a first alkyl group and a second alkyl group, the first alkyl group having a different number of carbon atoms than the second alkyl group, and provided that no individual aryl moiety is substituted with both the first alkyl group and the second alkyl group. That is, each respective aryl moiety is substituted exclusively with either the first alkyl group or the second alkyl group, but not both.

At least one of the phosphites in the liquid composition would have the structure:

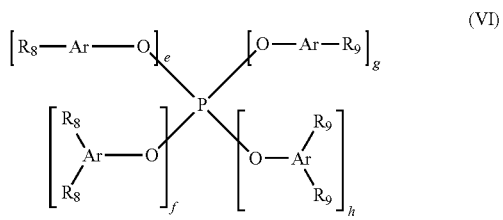

(VI)

wherein e, f, g and h are independently selected from 0, 1 and 2, provided that e+f+g+h=3, e +f=1 or 2, and g+h=1 or 2. Each Ar is independently selected from the aromatic moieties defined above. Preferably, each Ar is a phenolic, more preferably phenyl. Each $R_8$ is an alkyl group having the same number of carbon atoms and each $R_9$ is an alkyl group having the same number of carbon atoms, provided that $R_8$ has a different number of carbon atoms than $R_9$. Thus, $R_8$ and $R_9$ preferably are independently selected from straight or branched $C_1$-$C_{18}$ alkyl groups, e.g., $C_1$-$C_{12}$, e.g., $C_2$-$C_5$ or $C_2$-$C_4$ alkyl groups, provided that that $R_8$ has a different number of carbon atoms than $R_9$. In one embodiment, one of $R_8$ or $R_9$ is $C_4$ alkyl, e.g., t-butyl, and the other of $R_8$ or $R_9$ is $C_5$ alkyl, e.g., t-amyl.

In one aspect, the phosphite composition comprises at least two phosphites, wherein the first and second phosphites are independently selected from the group consisting of: bis (Alkyl-A-aryl)di-Alkyl-B-aryl phosphite, bis(Alkyl-B-aryl) di-Alkyl-A-aryl phosphite, bis(di-Alkyl-A-aryl)Alkyl-B-aryl phosphite, bis(di-Alkyl-B-aryl)Alkyl-A-aryl phosphite, (Alkyl-A-aryl)(Alkyl-B-aryl)(di-Alkyl-A-aryl) phosphite, (Alkyl-A-aryl)(Alkyl-B-aryl)(di-Alkyl-B-aryl) phosphite, (Alkyl-A-aryl)(di-Alkyl-B-aryl)(di-Alkyl-A-aryl) phosphite, (Alkyl-B-aryl)(di-Alkyl-B-aryl)(di-Alkyl-A-aryl) phosphite, bis(di-Alkyl-A-aryl)di-Alkyl-B-aryl phosphite, and bis(di-Alkyl-B-aryl)di-Alkyl-A-aryl phosphite, provided that the second phosphite is different from the first phosphite. The phosphite composition in this embodiment may also comprise one or more of tris(Alkyl-A-aryl) phosphite, tris (Alkyl-B-aryl) phosphite, tris(di-Alkyl-A-aryl) phosphite, tris(di-Alkyl-B-aryl) phosphite, bis(Alkyl-A-aryl)di-Alkyl-A-aryl phosphite, bis(di-Alkyl-A-aryl)Alkyl-A-aryl phosphite, bis(Alkyl-B-aryl)di-Alkyl-B-aryl phosphite, and bis (di-Alkyl-B-aryl)Alkyl-B-aryl phosphite. Other phosphites, possibly having an alkyl substituents other than Alkyl-A and Alkyl-B, may also be included in the phosphite composition.

The relative amounts of Alkyl-A and Alkyl-B groups (or optional additional groups) contained in the phosphite composition may vary so long as the phosphite composition is a liquid at ambient conditions. In one embodiment, the molar ratio of Alkyl-A groups to Alkyl-B groups, e.g., the first alkylated aryl groups to second alkylated aryl groups, is from 1:10 to 10:1, e.g., from 1:4 to 4:1 or from 2:1 to 1:1. In terms of weight percentages, the phosphite composition optionally comprises the first alkylated aryl moiety in an amount from 5 to 95 weight percent, e.g., from 25 to 75 weight percent, or from 35 to 60 weight percent, and the second alkylated aryl moiety in an amount from 5 to 95 weight percent, e.g., from 25 to 75 weight percent or from 35 to 60 weight percent. More preferably, the phosphite composition comprises the alkyl groups with the lesser number of carbon atoms, i.e., Alkyl-A, in an amount greater than the alkyl groups with the greater number of carbon atoms, i.e., Alkyl-B. By including a greater amount of Alkyl-A than Alkyl-B, the overall phosphorus content may be advantageously maximized. In addition, the presence of Alkyl-B in the phosphite compositions of the invention allows for a more diverse phosphite composition than a comparable phosphite composition that does not include Alkyl-B. Such phosphite composition complexity may improve, e.g., lower, the viscosity and processing characteristics for the overall phosphite composition.

In some embodiments, for example, the phosphite composition comprises the Alkyl-A group in an amount greater than 50 weight percent, greater than 60 weight percent or greater than 75 weight percent, based on the total weight of all phosphite alkyl groups in the phosphite composition, and preferably comprises the Alkyl-B group in an amount greater than 5 weight percent, greater than 10 weight percent or greater than 25 weight percent, based on the total weight of all phosphite alkyl groups in the phosphite composition. In terms of ranges, the phosphite composition preferably comprises the Alkyl-A group in an amount from 50 to 90 weight percent, e.g., in an amount from 60 to 90 weight percent or in an amount from 75 to 90 weight percent, and the Alkyl-B group in an amount from 10 to 50 weight percent, e.g., from 10 to 40 weight percent or from 10 to 25 weight percent, based on the weight of all phosphite alkyl groups in the phosphite composition.

In other embodiments, the phosphite composition comprises the alkyl groups with the lesser number of carbon atoms, i.e., Alkyl-A groups, in an amount less than the alkyl groups with the greater number of carbon atoms, i.e., Alkyl-B groups. In this embodiment, the phosphite composition optionally comprises the Alkyl-B groups in an amount from 50 to 90 weight percent, e.g., in an amount from 60 to 90 weight percent or in an amount from 75 to 90 weight percent, and the Alkyl-A groups in an amount from 10 to 50 weight percent, e.g., from 10 to 40 weight percent or from 10 to 25 weight percent, based on the weight of all phosphite alkyl groups in the phosphite composition.

In one aspect of this embodiment, Alkyl-A is propyl, e.g., isopropyl, and Alkyl-B is butyl, e.g., t-butyl. In another aspect, Alkyl-A is propyl, e.g., isopropyl, and Alkyl-B is amyl, e.g., t-amyl. In still another preferred aspect, Alkyl-A is butyl, e.g., t-butyl, and Alkyl-B is amyl, e.g., t-amyl.

In this embodiment, the phosphite compositions may be particularly diverse containing many different phosphite compounds. In some exemplary embodiments, the phosphite composition optionally comprises tris(monoalkylaryl)phosphites, e.g., tris(Alkyl-A-phenyl) phosphite, tris(Alkyl-B-phenyl) phosphite, bis(Alkyl-A-phenyl)Alkyl-B-phenyl phosphite, bis(di-Alkyl-A-phenyl)di-Alkyl-B-phenyl phosphite, and the like, in an amount from 20 to 70 weight percent, e.g., from 15 to 55 weight percent, or from 37 to 54 weight percent, based on the total weight of all phosphites in the phosphite composition. The phosphite composition optionally comprises bis(monoalkylaryl)dialkylaryl phosphites, e.g., bis(Alkyl-A-phenyl)di-Alkyl-B-phenyl phosphite, bis (Alkyl-B-phenyl)di-Alkyl-A-phenyl phosphite, bis(Alkyl-A-phenyl)di-Alkyl-A-phenyl phosphite, bis(Alkyl-B-phenyl)di-Alkyl-B-phenyl phosphite, (Alkyl-A-phenyl)(Alkyl-B-phenyl)di-Alkyl-A-phenyl phosphite, and the like, in an amount from 15 to 60 weight percent, e.g., from 31 to 50 weight percent, or from 34 to 45 weight percent, based on the total weight of all phosphites in the phosphite composition. The phosphite composition optionally further comprises tris (dialkylaryl) phosphites and/or bis(dialkylaryl)monoalkylaryl phosphites. If present, the phosphite composition preferably comprises bis(dialkylaryl)monoalkylaryl phosphites, e.g., bis(di-Alkyl-A-phenyl)Alkyl-B-phenyl phosphite, bis (di-Alkyl-B-phenyl)Alkyl-A-phenyl phosphite, bis(di-Alkyl-A-phenyl)Alkyl-A-phenyl phosphite, bis(di-Alkyl-B-phenyl)Alkyl-B-phenyl phosphite, di-Alkyl-A-phenyl-di-Alkyl-B-phenyl-mono-Alkyl-B-phenyl phosphite, (di-Alkyl-A-phenyl)(di-Alkyl-B-phenyl)(Alkyl-A-phenyl) phosphite, and the like, in an amount of from 2 to 20 weight percent, e.g., from 4 to 20 weight percent or from 5 to 10 weight percent, based on the total weight of all phosphites in the phosphite composition. If present, the phosphite composition preferably comprises tris(dialkylaryl) phosphites, e.g., tris(di-Alkyl-A-phenyl) phosphite, tris(di-Alkyl-B-phenyl) phosphite, bis(di-Alkyl-A-phenyl)di-Alkyl-B-phenyl phosphite, and the like, in an amount from 0.1 to 20 weight percent, e.g., from 0.3 to 5 weight percent or from 0.5 to 1 weight percent, based on the total weight of all phosphites in the phosphite composition. As suggested by the above example compounds, for purposes of the present specification a tris(monoalkylaryl) phosphite and a tris(dialkylaryl) phosphite may include tris compounds having exclusively the same alkyl groups (either Alkyl-A or Alkyl-B), or may comprise a mixture of alkyl groups (e.g., Alkyl-A and Alkyl-B) so long as each aryl moiety on the phosphite is similarly substituted, i.e., all are monosubstituted or all or disubstituted, respectively. Similarly, the bis(dialkylaryl)monoalkylaryl phosphites and bis(monoalkylaryl)dialkylaryl phosphites may include exclusively the same alkyl group or different alkyl groups so long as the respective bis(dialkylaryl) monoalkylaryl phosphite compound includes two dialkylaryl groups and one monoalkylaryl group, and the bis(monoalkylaryl)dialkylaryl phosphite compound includes two monoalkylaryl groups and one dialkylaryl group.

Generally, the liquid phosphites of the second embodiment are reaction products of a phosphorous halide and an alkylate composition that is a mixture of alkylated hydroxyaryl compounds, some of which are alkylated with Alkyl-A and some of which are alkylated with Alkyl-B. Thus, in this embodiment of the invention, a mixed alkylate composition is employed in forming the desired phosphite composition. In one embodiment, the alkylated composition comprises a first alkylate and a second alkylate, where the alkyl group on the first alkylate has a different number of carbon atoms than the alkyl groups on the second alkylate. The alkylate composition may comprise, for example: (i) a first alkylate composition comprising mono and/or di-Alkyl-A-phenols, and (ii) a second alkylate composition comprising mono and/or di-Alkyl-B-phenols.

In one preferred embodiment, the alkylate composition comprises two or more compounds selected from the group consisting of a propylated hydroxyaryl compound, a butylated hydroxyaryl compound and an amylated hydroxyaryl compound. The propylated hydroxyaryl compound preferably is selected from the group consisting of 4-isopropyl phenol and 2,4-di-isopropyl phenol. The butylated hydroxyaryl compound preferably is selected from the group consisting of 4-t-butyl phenol and 2,4-di-t-butyl phenol. The amylated hydroxyaryl compound preferably is selected from the group consisting of 4-t-amyl phenol and 2,4-di-t-amyl phenol.

The first alkylate and the second alkylate optionally are separately synthesized and mixed to form the alkylate composition, which is subsequently reacted with the phosphorous halide to form the phosphite composition. Each alkylate, in one aspect, may be separately formed by the reaction between an olefin, e.g., propylene, butylene or amylene, and a hydroxyaryl compound, e.g., phenol. For example, the first alkylate may be derived from a first olefin, and the second alkylate may be derived from a second olefin having a different number of carbon atoms than the first olefin. Alternatively, the alkylate composition may be formed in a single reaction between the first and second olefins and the hydroxyaryl compound. Thus, to form the alkylate composition, a mixture of lower alkenes (e.g., two or more $C_3$-$C_6$ olefins, such as a mixture of butylene and amylenes) may be reacted with the phenolic compound either in parallel (feed in olefin A and B at the same time) or consecutively (i.e. olefin A is reacted first followed by olefin B).

In the alkylate synthesis process, the alkylates may be formed by contacting one or more phenolics with two or more olefins (in separate reactions or in a single reaction process) in the presence of a catalyst and under conditions effective to form the alkylate composition. Each of the two or more olefins preferably contains from 1 to 18 carbons, e.g., from 1 to 8 carbons, or from 4 to 6 carbons, provided that the first olefin has a different number of carbon atoms than the second olefin. As an alternative to using an olefin alkylating agent, one or more alkyl halides, alcohols, MTBE or TAME may be employed. The alkylating agents that are employed may comprise or be derived from a hydrocarbon stream comprising alkanes and alkenes, such as a petrochemical raffinate stream from a $C_4$ or $C_5$ fraction, or a dehydrogenation reaction product of an alkane, e.g., isobutane or isopentane. In this aspect, the alkanes pass through the alkylating process unaltered and may be easily separated from the product alkylate composition.

The ratio of olefins to phenolic preferably is such that the resulting alkylate composition is suitable for conversion to the desired phosphite composition when reacted with a phosphorous halide, keeping in mind that the resulting alkylate, e.g., first alkylate, may be blended with another alkylate, e.g., second alkylate, to form the alkylate composition that will be used in synthesizing the phosphite composition. In some exemplary embodiments, the total olefins to phenolic compound mole ratio ranges from 1:1 to 6:1, e.g., from 1.1:1 to 2:1 or from 1.25:1 to 1.4:1, although these ratios may very somewhat depending, for example, on the catalyst employed in the alkylation process and the desired composition and viscosity for the ultimately formed phosphite composition.

Although conditions for the alkylation process may vary widely, in some preferred embodiments, the reaction of the phenol and the two or more olefins (whether forming the first and second alkylates separately or together) may occur in an inert atmosphere (e.g., under nitrogen) at a temperature of from 60 to 160° C., e.g., from 70 to 145° C. or from 80 to 140° C. The reaction is preferably performed at a pressure of from 0.2 to 10 atm, e.g., from 0.2 to 5 atm or from 0.2 to 4 atm. In a batch reaction, the reaction time may last from 1 to 12 hours, e.g., from 2 to 10 hours, or from 3 to 5 hours. In a continuous reaction, the residence time may be from 0.1 to 5 hours, e.g., from 0.2 to 4 hours or from 0.5 to 1 hour. The alkylation preferably is performed in the presence of a catalyst. The catalyst may, for example, be selected from the group consisting of acid clay catalyst, cationic ion exchange resins, Brönsted acids, e.g., sulfuric acid, trifluoromethanesulfonic acid (triflic acid) and phosphotungstic acid, or Lewis acids, e.g., $BF_3$. Suitable commercial acid clay catalysts include Fulcat™ 22B (Rockwood Additives). In one embodiment, the sulfonic acid-type cation-exchange resin catalyst useful in the present invention can be, for example, a sulfonated styrene-divinyl benzene copolymer, a sulfonated crosslinked styrene polymer, a phenol formaldehyde-sulfonic acid resin, or a benzene formaldehyde-sulfonic acid resin. Cation exchange resins useful in the present invention include for example styrene-divinylbenzene types of strong acid ion exchange resins such as Dowex™ 50WX4, Dowex 50WX2, Dowex M-31, Dowex Monosphere M-31, Dowex DR-2030 and Dowex Monosphere DR-2030 catalysts (Dow Chemical). Other appropriate resins include: Amberlyst™ 15, Amberlyst 131, Amberlyst 35, Amberlyst 36, and A21 (Rohm and Hass, subsidiary of Dow); Diaion™ WA30, Diaion SK104, Diaion SKIB, Diaion PK208, Diaion PK212 and Diaion PK216 (Mitsubishi); Tulsion™ T-38, Tulsion T-62, Tulsion T-66, Tulsion T-3825 and Tulsion T-3830 (Thermax); Lewatit™ K1131, Lewatit K1221, Lewatit K1261 and Lewatit SC 104 (Sybron Chemicals); Indion™ 180 and Indion 225 (Ion Exchange (India) Limited); and Purolite™ CT-175, Purolite™ CT-169, and Purolite™ CT-275(Purolite).

In one embodiment, a batch alkylate synthesis takes place in a pot-type reactor. In another embodiment, the alkylate synthesis is conducted on a continuous basis in a continuous type reactor. In the continuous process, the alkylation reaction is optionally quenched using a polar solvent, water, that forms a liquid phase containing most, if not all, of the catalyst and a organic phase containing the alkylated aryl compound, which may be removed by distillation.

In one aspect of the process, any free phenolic compounds that are not reacted with the olefins may be removed from the mixture of reaction products through distillation at a temperature, for example, of from 70 to 160° C. and at a pressure of from 1 to 10 mbar.

As indicated above, depending on the desired composition (e.g., propylated, butylated and/or amylated) and target viscosity for the alkylate composition as well as the ultimately formed phosphite composition, the components and component concentrations in the alkylate composition may vary widely. In one embodiment, for example, the alkylate composition comprises 4-butyl phenol, e.g., 4-t-butyl phenol, and 2,4-diamyl phenol, e.g., 2,4-di-t-amyl phenol, preferably in combination in an amount greater than 90 wt % or greater than 95 wt %. In another embodiment, the alkylate composition comprises 4-amyl phenol, e.g., 4-t-amyl phenol, and 2,4-dibutyl phenol, e.g., 2,4-di-t-butyl phenol, preferably in combination in an amount greater than 90 wt % or greater than 95 wt. %. In another embodiment, the alkylate composition comprises 4-isopropyl phenol and 2,4-dibutyl phenol, e.g., 2,4-di-t-butyl phenol, preferably in combination in an amount greater than 90 wt % or greater than 95 wt. %. In another embodiment, the alkylate composition comprises 4-butyl phenol, e.g., 4-t-butyl phenol, and 2,4-di-isopropyl phenol, preferably in combination in an amount greater than 90 wt % or greater than 95 wt. %. In another embodiment, the alkylate composition comprises 4-isopropyl phenol and 2,4-diamyl phenol, e.g., 2,4-di-t-amyl phenol, preferably in combination in an amount greater than 90 wt % or greater than 95 wt. %. In another embodiment, the alkylate composition comprises 4-amyl phenol, e.g., 4-t-amyl phenol, and 2,4-di-isopropyl phenol, preferably in combination in an amount greater than 90 wt % or greater than 95 wt. %. In still another embodiment, the alkylate composition comprises a complex mixture of phenolics, for example, comprising three or four of the following: a 4-butyl phenol (e.g., 4-t-butyl phenol), a 2,4-dibutyl phenol (e.g., 2,4-di-t-butyl phenol), 4-amyl phenol (e.g., 4-t-amyl phenol), and a 2,4-diamyl phenol (e.g., 2,4-di-t-amyl phenol), preferably in combination in an amount greater than 90 wt % or greater than 95 wt. %. Similar complex alkylate compositions are also possible with propyl/amyl and propyl/butyl. In these embodiments, the weight ratio of monosubstituted to disubstituted phenols contained in the alkylate composition preferably are as provided below.

In terms of component concentrations, the alkylate composition may comprise, for example, from 5 to 95 wt %, e.g., from 10 to 70 wt % or from 30 to 65 wt %, of a p-alkylated phenol and from 5 to 95 wt %, e.g., from 10 to 70 wt % or from 30 to 65 wt %, of a o,p-dialkylated phenol. The p-alkylated phenol may comprise p-Alkyl-A phenol, p-Alkyl-B phenol or both p-Alkyl-A phenol and p-Alkyl-B phenol. The o,p-dialkylated phenol may comprise either o,p-di-Alkyl-A phenol or o,p-di-Alkyl-B phenol, or both o,p-di-Alkyl-A phenol and o,p-di-Alkyl-B phenol.

In some preferred embodiments, the alkylate composition comprises a monoalkyl phenol, e.g., a 4-amyl phenol and/or a 4-butyl phenol, and a dialkyl phenol, e.g., a 2,4-di-amyl phenol and/or a 2,4-dibutyl phenol. The 4-alkyl phenol optionally is present in an amount greater than 40 wt %, greater than 50 wt %, greater than 60 wt %, greater than 70 wt % or greater than 75 wt % and optionally in an amount less than 95 wt %, e.g., less than 85 wt %, less than 80 wt %, less than 75 wt % or less than 65 wt %. In terms of ranges, in some embodiments, the 4-alkyl phenol, e.g., 4-t-amyl phenol and/or 4-t-butyl phenol, is present in an amount ranging from 25 wt % to 99 wt %, e.g., from 45 wt % to 80 wt %, from 60 wt % to 75 wt %, or from 65 wt % to 75 wt %. In this aspect, the dialkyl phenols, e.g., 2,4-di-t-amyl phenol and/or 2,4-di-t-butyl phenol, preferably are present in an amount ranging from 1 wt % to 60 wt %, e.g., from 10 wt % to 50 wt %, from 25 wt % to 40 wt %, or from 25 wt % to 35 wt %. Optionally, the dialkyl phenol is present in an amount less than 60 wt %, e.g., less than 55 wt %, less than 45 wt % or less than 35 wt %. In terms of lower range limitations, the dialkyl phenol, e.g., 2,4-di-t-amyl phenol and/or 2,4-di-t-butyl phenol, optionally is present in an amount greater than 10 wt %, greater than 20 wt %, greater than 30 wt %, or greater than 40 wt %.

The weight ratio of monoalkyl phenols, such as 4-t-amyl phenol or 4-t-butyl phenol, to dialkyl phenols, e.g., 2,4-di-t-amyl phenol or 2,4-di-t-butyl phenol, can be selected or adjusted so as to produce the desired alkylate composition that is suitable for being used as a reactant for forming an alkylaryl phosphite composition that is a liquid at ambient conditions. In some embodiments, the weight ratio of monoalkyl phenols to dialkyl phenols in the alkylate compositions ranges from 5:1 to 1:2, e.g., from 5:1 to 1:1, from 3:1 to 1:1, or from 1.5:1 to 1:1. Alkylate compositions outside of these weight ratio ranges may produce phosphite compositions that are not liquids and/or are meta-stable liquids under ambient conditions.

The alkylate composition, optionally formed from the above-described alkylate composition synthesis process, preferably is further reacted with a phosphorus trihalide, with or without catalyst, to form the liquid phosphite compositions of the invention, as described above in connection with the first embodiment of the invention. Thus, in one embodiment, the liquid phosphite compositions of the present invention are obtained in a direct chemical reaction, in which the molar ratio of the alkylated phenol is adjusted to yield a phosphite composition that is a liquid at ambient conditions. A schematic of one reaction method that may be employed to form such phosphite compositions is as follows.

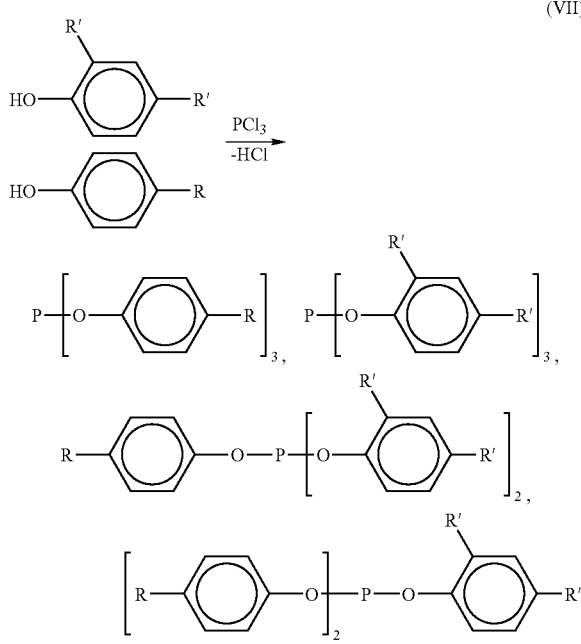

wherein R and R' are independently any of the groups as defined above (e.g., $R_8$ and $R_9$, respectively), but R and R' have a different number of carbon atoms. Note that a minor amount of other alkylated phenols, e.g., ortho-substituted monoalkylated phenols, may be included as an additional reactant in the above reaction scheme and would form additional derivative phosphites, but these additional reactants and products have been omitted from this reaction for clarity.

Mixed Olefins Embodiment

In the third embodiment of the present invention, the liquid phosphite composition comprises one or more, preferably two or more, three or more, or four or more phosphites, having at least one aryl moiety that includes two or more alkyl groups having a different number of carbon atoms. In one aspect of this embodiment, the phosphite composition comprises at least one phosphite of the structure:

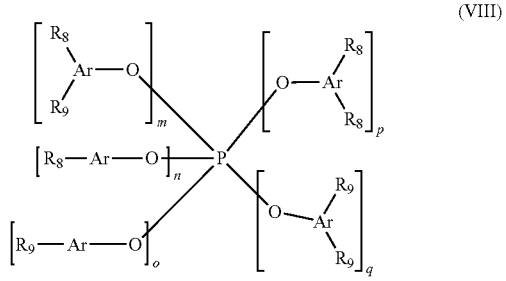

wherein m is an integer selected from 1, 2 and 3; n, o, p and q are integers independently selected from 0, 1 and 2, provided that m+n+o+p+q=3. Each Ar is independently selected from the aromatic moieties defined above. Preferably, each Ar is a phenolic, more preferably phenyl. Each $R_8$ is an alkyl group having the same number of carbon atoms and each $R_9$ is an alkyl group having the same number of carbon atoms, pro-vided that $R_8$ has a different number of carbon atoms than $R_9$. Thus, $R_8$ and $R_9$ preferably are independently selected from straight or branched $C_1$-$C_{18}$ alkyl groups, e.g., $C_1$-$C_{12}$, $C_2$-$C_5$ or $C_2$-$C_4$ alkyl groups, provided that that $R_8$ has a different number of carbon atoms than $R_9$. In one embodiment, one of $R_8$ or $R_9$ is $C_4$ alkyl, e.g., t-butyl, and the other of $R_8$ or $R_9$ is $C_5$ alkyl, e.g., t-amyl. Where the aromatic moiety is phenyl, each respective monoalkylaryl group may be independently in either the ortho or para position. Where the aromatic moiety is phenyl, the dialkylaryl groups preferably are substituted in the 2 and 4 positions, although other substitutions are possible. Optionally, the phosphite composition of the third embodiment further comprises additional phosphites not having the general structure (VIII).

In one embodiment, the molar ratio of Alkyl-A to Alkyl-B is from 1:10 to 10:1, e.g., from 1:4 to 4:1 or from 2:1 to 1:1. It is should be understood that the first and/or second phosphites may comprises one or more of the Alkyl-A compounds listed above. In terms of molar amounts, the first phosphite may be present in the alkylate composition in an amount from 5 to 95 mole %, e.g., from 25 to 75 mole %, or from 35 to 60 mole %. In terms of molar amounts, the second phosphite may be present in the alkyl composition in an amount from 5 to 95 mole %, e.g., from 25 to 75 mole %, or from 35 to 60 mole %.

In terms of weight percentages, in this embodiment, the phosphite composition optionally comprises the Alkyl-A in an amount from 5 to 95 weight percent, e.g., from 25 to 75 weight percent, or from 35 to 60 weight percent, and Alkyl-B in an amount from 5 to 95 weight percent, e.g., from 25 to 75 weight percent or from 35 to 60 weight percent. More preferably, the phosphite composition comprises the alkyl groups with the lesser number of carbon atoms, i.e., Alkyl-A, in an amount greater than the alkyl groups with the greater number of carbon atoms, i.e., Alkyl-B. By including a greater amount of Alkyl-A than Alkyl-B, the overall phosphorus content may be advantageously maximized. In addition, the presence of Alkyl-B in the phosphite compositions of the invention allows for a more diverse phosphite composition than a comparable phosphite composition that does not include Alkyl-B. Such phosphite composition complexity may improve, e.g., lower, the viscosity and processing characteristics for the overall phosphite composition.

In this embodiment, the phosphite composition optionally comprises the Alkyl-A group in an amount greater than 50 weight percent, greater than 60 weight percent or greater than 75 weight percent, based on the total weight of all phosphite alkyl groups in the phosphite composition, and preferably comprises the Alkyl-B group in an amount greater than 5 weight percent, greater than 10 weight percent or greater than 25 weight percent, based on the total weight of all phosphite alkyl groups in the phosphite composition. In terms of ranges, the phosphite composition preferably comprises the Alkyl-A group in an amount from 50 to 90 weight percent, e.g., in an amount from 60 to 90 weight percent or in an amount from 75 to 90 weight percent, and the Alkyl-B group in an amount from 10 to 50 weight percent, e.g., from 10 to 40 weight percent or from 10 to 25 weight percent, based on the weight of all phosphite alkyl groups in the phosphite composition.

In other embodiments, the phosphite composition comprises the alkyl groups with the lesser number of carbon atoms, i.e., Alkyl-A groups, in an amount less than the alkyl groups with the greater number of carbon atoms, i.e., Alkyl-B groups. In this embodiment, the phosphite composition optionally comprises the Alkyl-B groups in an amount from 50 to 90 weight percent, e.g., in an amount from 60 to 90 weight percent or in an amount from 75 to 90 weight percent, and the Alkyl-A groups in an amount from 10 to 50 weight percent, e.g., from 10 to 40 weight percent or from 10 to 25 weight percent, based on the weight of all phosphite alkyl groups in the phosphite composition.

In one aspect of this embodiment, Alkyl-A is propyl, e.g., isopropyl, and Alkyl-B is butyl, e.g., t-butyl. In another aspect, Alkyl-A is propyl, e.g., isopropyl, and Alkyl-B is amyl, e.g., t-amyl. In still another preferred aspect, Alkyl-A is butyl, e.g., t-butyl, and Alkyl-B is amyl, e.g., t-amyl.

In this embodiment, the phosphite compositions may be particularly diverse containing many different phosphite compounds, potentially more than in either the first or second embodiments. In some exemplary embodiments, the phosphite composition optionally comprises tris(monoalkylaryl) phosphites in an amount from 20 to 70 weight percent, e.g., from 15 to 55 weight percent, or from 37 to 54 weight percent, based on the total weight of all phosphites in the phosphite composition. The phosphite composition optionally comprises bis(monoalkylaryl)dialkylaryl phosphites in an amount from 15 to 60 weight percent, e.g., from 31 to 50 weight percent, or from 34 to 45 weight percent, based on the total weight of all phosphites in the phosphite composition. The phosphite composition optionally further comprises tris(dialkylaryl) phosphites and/or bis(dialkylaryl)monoalkylaryl phosphites. If present, the phosphite composition preferably comprises bis(dialkylaryl)monoalkylaryl phosphites in an amount of from 2 to 20 weight percent, e.g., from 4 to 20 weight percent or from 5 to 10 weight percent, based on the total weight of all phosphites in the phosphite composition. If present, the phosphite composition preferably comprises tris(dialkylaryl) phosphite in an amount from 0.1 to 20 weight percent, e.g., from 0.3 to 5 weight percent or from 0.5 to 1 weight percent, based on the total weight of all phosphites in the phosphite composition. In the above compositions, at least one phosphite contains an aryl group having two or more alkyl groups having a different number of carbon atoms, as discussed above.

Generally, the liquid phosphite composition of the third embodiment is a reaction product of a phosphorous halide and an alkylate composition, where the alkylate composition is the reaction product of two or more olefins having different numbers of carbon atoms and at least one hydroxyaryl compound. Using different olefins in the process allows the formation of hydroxyaryl compound, at least some of which are substituted with two or more alkyl groups having different numbers of carbon atoms. The composition of the alkylate composition may be modified by varying types and ratios of the reactants (e.g., olefins to hydroxyaryl compound as well as the ratio of first olefin to second olefin) and/or by modifying processing conditions of the alkylation process. In one embodiment, the mixture of olefins independently includes two or more straight or branched $C_2$-$C_{18}$ olefins, e.g., $C_3$-$C_{12}$ olefins, or $C_4$-$C_5$ olefins, provided that a first olefin has more carbon atoms than a second olefin. In one embodiment, the first olefin is a $C_2$-$C_{12}$ olefin and the second olefin is a $C_3$-$C_{18}$ olefin, and the first olefin has a fewer number of carbon atoms than the second olefin. Preferably, at least one of the first or second olefins is a branched olefin. Particularly preferred olefins include propylene, isobutylene and isoamylene.

The hydroxyaryl compound is an aromatic moiety having at least one hydroxyl and from 6 to 18 carbon atoms, e.g., phenol, 1-naphthol 2-naphthol, 9-phenanthrol, indanol, catechol, resorcinol, anthracen-2-ol, 4,4-biphenol, 4,4'-biphenol, xylenol, cresol, and derivatives thereof, preferably phenol.

During the alkylation, the mixture of olefins may be reacted in parallel with the hydroxyaryl compound, i.e., the first and second olefins are reacted together. In another embodiment, the mixture of olefins may be reacted with the hydroxyaryl compound in a consecutive manner, e.g., the first olefin is reacted first followed by the second olefin. Each of these embodiments is described in detail below.

Parallel Alkylation

When fed in parallel, the alkylate composition may be formed by contacting one or more hydroxyaryl compounds with a mixture of two or more olefins, optionally in the presence of a catalyst, and under conditions effective to form the alkylate composition. As an alternative to using an olefin alkylating agent, two or more alkyl halides or alcohols may be employed where the two or more alkyl halides or alcohols have different numbers of carbon atoms. The alkylating agent that is employed may comprise or be derived from a petrochemical raffinate stream, e.g., a $C_4$ or $C_5$ raffinate stream, comprising a combination of both alkanes and alkenes.

In one embodiment, the mixture of olefins is pre-mixed prior to the alkylation of the hydroxyaryl compound.

A schematic of one reaction method using a parallel alkylation to form an alkylate composition is as follows.

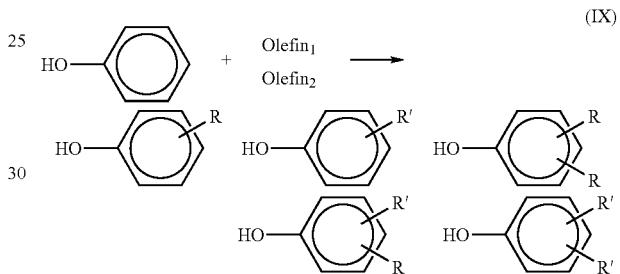

(IX)

where $Olefin_1$ and $Olefin_2$ are independently straight or branched $C_2$-$C_{12}$, e.g., $C_2$-$C_5$ or $C_2$-$C_4$, olefins having a different number of carbon atoms and R is the alkyl group formed from $Olefin_1$ as defined above, and R' is the alkyl group formed from $Olefin_2$ as defined above. In one embodiment, the dialkylate that includes R and R' alkyl groups is a preferred alkylated aryl compound and may be present in an amount from 20-70 mole % of the alkylate composition, e.g., from 35-60 mole %, or from 40-50 mole %.

The molar ratio of hydroxyaryl compound to the olefin mixture preferably is such that the resulting alkylate composition is suitable for conversion to the desired phosphite composition when reacted with a phosphorous halide. In some exemplary embodiments, the hydroxyaryl compound to olefin mixture mole ratio ranges from 1:6 to 1:1, e.g., from 1:4 to 1:1.2 or from 1.5:1 to 1:1.5, although these ratios may very somewhat depending, for example, on the catalyst employed in the alkylation process and the desired composition and viscosity for the ultimately formed phosphite composition.

The alkylation process conditions discussed above with reference to the second embodiment (mixed alkylate embodiment) of the invention also apply to this aspect of the invention.

Consecutive Alkylation

In consecutive alkylation, one or more hydroxyaryl compounds are reacted with one olefin, optionally in the presence of a catalyst, and under conditions effective to form a partial alkylate composition. The molar ratio of hydroxyaryl compounds to the first olefin is from 6:1 to 1:2, e.g. from 5:1 to 2:3, or form 2:1 to 3:4. The partial alkylate composition is then reacting with the second olefin (having a different number of carbon atoms than the first olefin) under similar conditions to form the alkylate composition. Optionally, an additional amount of hydroxyaryl compounds may also be charged to the partial alkylate composition. The molar ratio of the partial alkylate to the second olefin is from 15:1 to 2:1, e.g., from 8:1 to 3:1 or from 6:1 to 4:1. When consecutively added, it is preferred that the olefin having a fewer number of carbon atoms is initially added followed by the other olefin. Alternatives to olefin alkylating agents described in context of parallel reactions may also be used in consecutive alkylation.

A schematic of one reaction method using consecutive alkylation to form an alkylate composition is as follows.

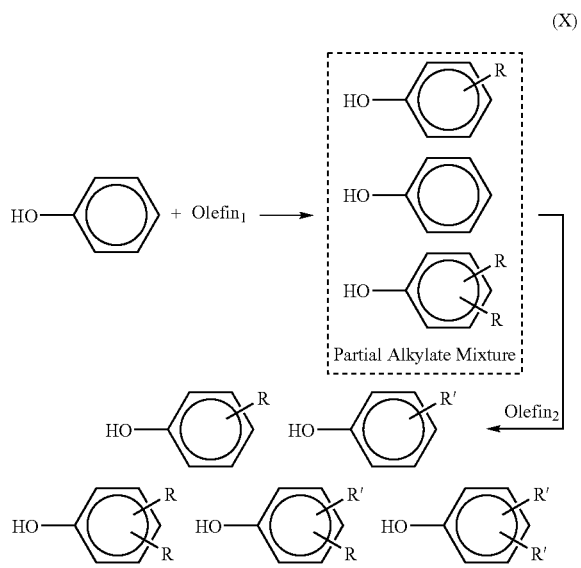

where Olefin$_1$, Olefin$_2$, R and R' are defined above. In one embodiment, the dialkylate that includes R and R' alkyl groups is a preferred alkylated hydroxyaryl compound and may be present in an amount from 20-70 mole % of the alkylate composition, e.g., from 35-60 mole %, or from 40-50 mole %.

The alkylation process conditions discussed above with reference to the second embodiment (mixed alkylate embodiment) of the invention also apply to this aspect of the invention.

As indicated above, depending on the desired mixed composition of alkylates and target viscosity for the alkylate composition as well as the ultimately formed phosphite composition, the composition of the alkylate composition may vary widely. The alkylate composition may comprise, for example, from 5 to 95 mole %, e.g., from 10 to 70 mole % or from 30 to 65 mole %, of a first alkylated hydroxyaryl compound, and from 5 to 95 mole %, e.g., from 10 to 70 mole % or from 30 to 65 mole %, of a second alkylated hydroxyaryl compound.

The alkylate composition comprises at least some dialkylated hydroxyaryl compounds, e.g., o,p-dialkylated phenols, that are substituted with both Alkyl-A and Alkyl-B. In addition, the alkylate composition may comprise a p-alkylated phenol such as p-Alkyl-A phenol, p-Alkyl-B phenol or both p-Alkyl-A phenol and p-Alkyl-B phenol. Additional o,p-dialkylated phenols in the alkylate composition may include o,p-di-Alkyl-A phenol, o,p-di-Alkyl-B phenol, or both o,p-di-Alkyl-A phenol and o,p-di-Alkyl-B phenol.

Any 4-alkyl phenol optionally is present in the alkylate composition in an amount greater than 40 wt %, greater than 50 wt %, greater than 60 wt %, greater than 70 wt % or greater than 75 wt % and optionally in an amount less than 95 wt %, e.g., less than 85 wt %, less than 80 wt %, less than 75 wt % or less than 65 wt %. In terms of ranges, in some embodiments, the 4-alkyl phenol, e.g., 4-t-amyl phenol and/or 4-t-butyl phenol, is present in an amount ranging from 25 wt % to 99 wt %, e.g., from 45 wt % to 80 wt %, from 60 wt % to 75 wt %, or from 65 wt % to 75 wt %. In this aspect, the dialkyl phenols, including phenols that are alkylated with both Alkyl-A and Alkyl-B, preferably are present in an amount ranging from 1 wt % to 60 wt %, e.g., from 10 wt % to 50 wt %, from 25 wt % to 40 wt %, or from 25 wt % to 35 wt %. Optionally, the dialkyl phenols are present in an amount less than 60 wt %, e.g., less than 55 wt %, less than 45 wt % or less than 35 wt %. In terms of lower range limitations, the dialkyl phenols optionally are present in an amount greater than 10 wt %, greater than 20 wt %, greater than 30 wt %, or greater than 40 wt %.

The weight ratio of monoalkyl phenols, such as 4-t-amyl phenol or 4-t-butyl phenol, to dialkyl phenols, including phenols that are alkylated with both Alkyl-A and Alkyl-B, can be selected or adjusted so as to produce the desired alkylate composition that is suitable for being used as a reactant for forming an alkylaryl phosphite composition that is a liquid at ambient conditions. In some embodiments, the weight ratio of monoalkyl phenols to dialkyl phenols in the alkylate compositions ranges from 5:1 to 1:2, e.g., from 5:1 to 1:1, from 3:1 to 1:1, or from 1.5:1 to 1:1. Alkylate compositions outside of these weight ratio ranges may produce phosphite compositions that are not liquids and/or are meta-stable liquids under ambient conditions.

The alkylate composition formed by parallel or consecutive alkylation preferably is further reacted with a phosphorus trihalide, with or without catalyst, to form a liquid phosphite composition. Because the alkylate composition produced by the synthesis process preferably are not isolated, all of the alkylates in the mixture ideally are added simultaneously to the phosphorus trihalide.

The process for forming the phosphite compositions of the third embodiment comprises reacting a phosphorous trihalide with the above described alkylate composition, which is formed from the reaction between a hydroxyaryl compound and two or more olefins (reacted in parallel or consecutively). The phosphite synthesis reaction is described above in connection with the first embodiment of the invention (Mixed Phosphite Embodiment).

Stabilizers

As discussed above, a stabilizing amount or effective amount of the phosphite composition of the invention may be used as a secondary antioxidant for various types of polymers. As used herein, by "stabilizing amount" and an "effective amount" it is meant when the polymer composition containing the phosphite compositions of the invention shows improved stability in any of its physical or color properties in comparison to an analogous polymer composition which does not include a phosphite composition of the invention. Examples of improved stability include improved stabilization against, for example, molecular weight degradation, color degradation, and the like from, for example, melt processing, weathering, and/or long term field exposure to heat, light, and/or other elements. In one example, improved stability is obtained in the form of one or both of lower initial color or additional resistance to weathering, as measured, for example, by initial yellowness index (YI), or by resistance to yellowing and change in color, when compared to a composition without the stabilizer additive.

The additives and stabilizers described herein are preferably present in an amount effective to improve composition stability. When one of the aforementioned phosphite compositions is utilized, the composition is generally present in an amount from about 0.001 to about 5 wt. %, e.g., from about 0.0025 to about 2 wt. % or from about 0.005 to about 1 wt. %, based on the total weight of the polymer including the weight of the phosphite composition and any other stabilizers or additives. The phosphite compositions of this invention stabilize resins especially during high temperature processing with relatively little change in melt index and/or color, even after multiple extrusions.

The invention further relates to a stabilized thermoplastics, comprising a base polymer (e.g., polymer resin) and any of the aforementioned phosphite compositions of the invention. The polymer resin may be a polymer such as a polyolefin, and the liquid phosphite composition may be used with a costabilizer, for example, hindered phenolics, aromatic amines, hydroxylamines, lactones, and thioethers. Thus, the thermoplastic that is stabilized by the phosphite compositions of the present invention may optionally contain one or more additional stabilizers or mixtures of stabilizers selected from the group consisting of the phenolic antioxidants, hindered amine light stabilizers (HALS), the ultraviolet light absorbers, phosphites, phosphonites, alkaline metal salts of fatty acids, hydrotalcites, metal oxides, epoxydized soybean oils, the hydroxylamines, the tertiary amine oxides, lactones, thermal reaction products of tertiary amine oxides, and the thiosynergists.

In one embodiment, the amount of each component in the stabilizing mixture, based on the total weight percent of the polymer or polymeric resin, is shown in Table 4.

TABLE 4

| Component | Range | Preferred Range |
| --- | --- | --- |
| Liquid phosphite compositions | 0.001-5.0 wt % | 0.005-1.0 wt % |
| Primary antioxidant | 0-5.0 wt % | 0.005-2.0 wt % |
| UV or light stabilizers | 0-3.0 wt % | 0.001-2.0 wt % |
| Metal deactivators | 0-3.0 wt % | 0.001-2.0 wt % |
| Other secondary antioxidants | 0-3.0 wt % | 0.001-2.0 wt % |
| Peroxide scavengers | 0-3.0 wt % | 0.001-2.0 wt % |
| Polyamide stabilizers | 0-3.0 wt % | 0.001-2.0 wt % |
| Basic co-stabilizers | 0-3.0 wt % | 0.001-2.0 wt % |
| Nucleating or clarifying agents | 0-3.0 wt % | 0.001-2.0 wt % |
| Aminoxy propanoate | 0-3.0 wt % | 0.001-2.0 wt % |

The phosphite compositions of the invention or the resulting stabilized polymer compositions optionally also comprise primary antioxidants such as the following:

(i) Alkylated monophenols, for example: 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2,6-bis(α-methylbenzyl)-4-methylphenol, 2-(α-methylcyclohexyl)-4,6-dimethylphenol, 2,6-dioctadecyl-4-methylphenol, 2,4,6,-tricyclohexyphenol, and 2,6-di-tert-butyl-4-methoxymethylphenol. Commercially available alkylated monophenols include Lowinox™ 624 and Naugard™ 431 made by Chemtura Corp. Other phenols are commercially available such as BHEB.

(ii) Alkylated hydroquinones, for example, 2,6-di-tert-butyl-4-methoxyphenol, 2,5-di-tert-butyl-hydroquinone, 2,5-di-tert-amyl-hydroquinone, and 2,6-diphenyl-4-octadecyloxyphenol. Commercially available alkylated hydroquinones include Lowinox AH25 made by Chemtura.

(iii) Hydroxylated thiodiphenyl ethers, for example, 2,2'-thio-bis-(6-tert-butyl-4-methylphenol), 2,2'-thio-bis-(4-octylphenol), 4,4'-thio-bis-(6-tert-butyl-3-methylphenol), and 4,4'-thio-bis-(6-tert-butyl-2-methyphenol). Commercially available hydroxylated thiodiphenyl ethers include Lowinox TBM6, and Lowinox TBP6 made by Chemtura.

(iv) Alkylidene-bisphenols, for example, 2,2'-methylene-bis-(6-tert-butyl-4-methylphenol), 2,2'-methylene-bis-(6-tert-butyl-4-ethylphenol), 2,2'-methylene-bis-(4-methyl-6-(α-methylcyclohexyl)phenol), 2,2'-methylene-bis-(4-methyl-6-cyclohexylphenol), 2,2'-methylene-bis-(6-nonyl-4-methylphenol), 2,2'-methylene-bis-(6-nonyl-4-methylphenol), 2,2'-methylene-bis-(6-(α-methylbenzyl)-4-nonylphenol), 2,2'-methylene-bis-(6-(alpha,alpha-dimethylbenzyl)-4-nonyl-phenol), 2,2'-methylene-bis-(4,6-di-tert-butylphenol), 2,2'-ethylidene-bis-(6-tert-butyl-4-isobutylphenol), 4,4'-methylene-bis-(2,6-di-tert-butylphenol), 4,4'-methylene-bis-(6-tert-butyl-2-methylphenol), 1,1-bis-(5-tert-butyl-4-hydroxy-2-methylphenol)butane, 1,1-bis(2-methyl-4-hydroxy-5-tert-butylphenyl)butane, 2,2'-isobutylidene-bis(4,6-dimethylphenol), 2,6-di-(3-tert-butyl-5-methyl-2-hydroxybenzyl)-4-methylphenol, 1,1,3-tris-(5-tert-butyl-4-hydroxy-2-methylphenyl)butane, 1,1-bis-(5-tert-butyl-4-hydroxy-2-methylphenyl)-3-dodecyl-mercaptobutane, ethyleneglycol-bis-(3,3,-bis-(3'-tert-butyl-4'-hydroxyphenyl)-butyrate)-di-(3-tert-butyl-4-hydroxy-5-methylphenyl)-dicyclopentadiene, and di-(2-(3'-tert-butyl-2'hydroxy-5'methyl-benzyl)-6-tert-butyl-4-methylphenyl)terephthalate. Commercially available alkylidene-bisphenols include Lowinox 22M46, Lowinox WSP, Lowinox 44B25, Naugard 536, Naugawhite™, and Lowinox 221B46 made by Chemtura.

(v) Benzyl compounds, for example, 1,3,5-tris-(3,5-di-tert-butyl-4-hydroxybenzyl)-2,4,6-trimethylbenzene, bis-(3,5-di-tert-butyl-4-hydroxybenzyl)sulfide, isooctyl 3,5-di-tert-butyl-4-hydroxybenzyl-mercapto-acetate, bis-(4-tert-butyl-3-hydroxy-2,6-dimethylbenzyl)dithiol-terephthalate, 1,3,5-tris-(3,5-di-tert-butyl-4 hydroxybenzyl)isocyanurate, 1,3,5-tris-(4-tert-butyl-3-hydroxy-2,6-dimethylbenzyl) isocyanurate, 1,3,5-tris(4-t-butyl-3-hydroxy-2,6-dimethylbenzyl)-1,3,5-Triazine-2,4,6-(1H,3H,5H)-trione, dioctadecyl-3,5-di-tert-butyl-4-hydroxybenzyl-phosphonate, calcium salt of monoethyl 3,5-di-tert-butyl-4-hydroxybenzylphosphonate, 1,3,5-tris-(3,5-dicyclohexyl-4-hydroxybenzyl)isocyanurate. Commercially available benzyl compounds include Anox™ IC-14, Anox 330 and Lowinox 1790 made by Chemtura.

(vi) Acylaminophenols, for example, 4-hydroxylauric acid anilide, 4-hydroxy-stearic acid amilide, 2,4-bis-octylmercapto-6-(3,5-tert-butyl-4-hydroxyanilino)-s-triazine, and octyl-N-(3,5-di-tert-butyl-4-hydroxyphenyl)-carbamate.

(vii) Esters of beta-(3,5-di-tert-butyl-4-hydroxyphenol)-propionic acid with monohydric or polyhydric alcohols, for example, methanol, diethyleneglycol, octadecanol, triethyleneglycol, 1,6-hexanediol, pentaerythritol, neopentylglycol, tris-hydroxyethylisocyanurate, thiodiethyleneglycol, di-hydroxyethyl oxalic acid diamide. Such phenols also include tetrakis [methylene {3,5-di-tert-butyl-4-hydroxycinnamate}]methane. Commercially available esters include Anox 20, Anox 1315, Lowinox GP45, Naugalube 38, Naugalube 531, Anox PP18, Naugard PS48 and Naugard XL-1 made by Chemtura.

(viii) Thio esters of beta-(5-tert-butyl-4-hydroxy-3-methylphenyl)-propionic acid with monohydric or polyhydric alcohols, for example, methanol, diethyleneglycol, octadecanol, triethyleneglycol, 1,6-hexanediol, pentaerythritol, neopentylglycol, tris-hydroxyethyl isocyanurate, thiodiethyleneglycol, dihydroxyethyl oxalic acid diamide. Commercially available thio esters include Naugalube™ 15 and Anox 70 made by Chemtura.

(ix) Amides of beta-(3,5-di-tert-butyl-4-hydroxyphenol)-propionic acid for example, N,N'-di-(3,5-di-tert-butyl-4-hydroxyphenylpropionyl)-hexammethylen-diamine, N,N'-di-(3,5-di-tert-butyl-4-hydroxyphenylpropionyl) trimethylenediamine, N,N'-di-(3,5-di-tert-butyl-4-hydroxyphenylpropionyl)-hydrazine, N,N'-Hexamethylene bis[3-(3,5-di-t-butyl-4-hydroxyphenyl)propionamide, and 1,2-Bis(3,5-di-tert-butyl-4-hydroxyhydrocinnamoyl)hydrazine. Commercially available amides include Lowinox HD98 and Lowinox MD24 made by Chemtura.

(x) Other phenolic antioxidants include the following phenols. Polymeric phenols such as the reaction product of 4-methylphenol with dicyclopentadiene and isobutylene, commercially available as Lowinox CPL; Chemtura. Alkylidene-poly-phenols, such as 1,3 tris(3-methyl-4-hydroxyl-5-t-butyl-phenyl)-butane (Lowinox CA22; Chemtura). Thio phenols such as 2,6-di-tert-butyl-4-(4,6-bis(octylthio)-1,3,5-triazin-2-ylamino) phenol (Irganox™ 565; Ciba), 4,6-bis(octylthiomethyl)-o-cresol (Irganox 1520; Ciba); 4,6-bis(dodecylthiomethyl)-o-cresol (Irganox 1726; Ciba). Hydroxylamines, such as bis(octadecyl)hydroxylamine (Irgastab™ FS 042; Ciba). Ester phenols include bis[3,3-bis(4-hydroxy-3-tert-butyl phenyl)butanoic acid]glycol ester (Hostanox™ O3; Clariant Chemicals). Still other phenols include 2-[1-(2-hydroxy-3,5-di-tert-pentylphenyl)ethyl]-4,6-di-tert-pentylphenyl acrylate (Sumilizer GS; Sumitomo Chemical).

In one embodiment, the stabilizing composition comprises one phenolic selected from the group consisting of tetrakis-methylene (3,5-di-t-butyl-4-hydroxylhydrocinnamate) methane (Anox 20), 1,3,5-tris(3,5-di-t-butyl-4-hydroxybenzyl) isocyanurate (Anox IC-14), 1,3,5-tris(4-tert.-butyl-3-hydroxy-2,6-dimethylbenzyl)-1,3,5-triazine-2,4,6-(1H,3H, 5H)-trione (Lowinox 1790), octyl-3-(3,5-di-t-butyl-4-hydroxyphenyl) propionate (Anox PP18), bis(octadecyl) hydroxylamine (Irgastab FS-042), 1,3,5-trimethyl-2,4,6-tris (3,5-di-tert-4-hydroxybenzyl)benzene (Anox 330), 2,6-bis (α-methylbenzyl)-4-methylphenol (Naugalube 431), 3,5-bis (1,1-dimethylethyl)-4-hydroxy-benzenepropanoic acid (Anox 1315), 2,6-di-t-butyl-4-ethyl-phenol (BHEB), and mixtures thereof, and the liquid phosphite composition defined herein.

The phosphite compositions and/or the resulting stabilized polymeric compositions optionally also comprise one or more UV absorbers and/or light stabilizers, such as the following:

(i) 2-(2'-hydroxyphenyl)-benzotriazoles, for example, the 5'-methyl-, 3'5'-di-tert-butyl-, 3'5'-di-tert-amyl-, 5'-tert-butyl-, 5'-tert-amyl-, 5'(1,1,3,3-tetramethylbutyl)-, 5-chloro-3', 5'-di-tert-butyl-, 5-chloro-3'-tert-butyl-5'methyl-, 3'-sec-butyl-5'tert-butyl-,4'-octoxy, 3',5'-ditert-amyl-3',5'-bis-(α,α-dimethylbenzyl)-derivatives. Commercially available 2-(2'-hydroxyphenyl)-benzotriazoles include Lowilite™ 26, Lowilite 27, Lowilite 28, Lowilite 29, Lowilite 35, Lowilite 55, and Lowilite 234 made by Chemtura.

(ii) 2-Hydroxy-benzophenones, for example, the 4-hydroxy, 4-methoxy-, 4-octoxy, 4-decyloxy-, 4-dodecyloxy-, 4-benzyloxy-, 2,4-dihydroxy-, 4,2',4'-trihydroxy- and 2'-hydroxy-4,4'-dimethoxy-derivative. Exemplary 2-hydroxy-benzophenones include 2-hydroxy-4-methoxybenzophenone, 2-hydroxy-4-ethoxybenzophenone, 2,4-dihydroxybenzophenone, and 2-hydroxy-4-propoxybenzophenone. Commercially available 2-(2'-hydroxyphenyl)-benzotriazoles include Lowilite 20, Lowilite 22, Lowilite 20S, and Lowilite 24 made by Chemtura.

(iii) Esters of substituted and unsubstituted benzoic acids for example, phenyl salicylate, 4-tert-butylphenyl-salicilate, octylphenyl salicylate, dibenzoylresorcinol, bis-(4-tert-butylbenzoyl)-resorcinol, benzoylresorcinol, 2,4-di-tert-butyl-phenyl-3,5-di-tert-butyl-4-hydroxybenzoate and hexadecyl-3,5-di-tert-butyl-4-hydroxybenzoate.

(iv) UV absorbers and light stabilizers may also comprise acrylates, for example, alpha-cyano-beta, beta-diphenylacrylic acid-ethyl ester or isooctyl ester, alpha-carbomethoxy-cinnamic acid methyl ester, alpha-cyano-beta-methyl-p-methoxy-cinnamic acid methyl ester or butyl ester, alpha-carbomethoxy-p-methoxy-cinnamic acid methyl ester, N-(beta-carbomethoxy-beta-cyano-vinyl)-2-methyl-indoline.

(v) Nickel compounds are also suitable UV absorbers and light stabilizers. Exemplary nickel compounds include nickel complexes of 2,2'-thio-bis(4-(1,1,1,3-tetramethylbutyl)-phenol), such as the 1:1 or 1:2 complex, optionally with additional ligands such as n-butylamine, triethanolamine or N-cyclohexyl-diethanolamine, nickel dibutyldithiocarbamate, nickel salts of 4-hydroxy-3,5-di-tert-butylbenzylphosphonic acid monoalkyl esters, such as of the methyl, ethyl, or butyl ester, nickel complexes of ketoximes such as of 2-hydroxy-4-methyl-penyl undecyl ketoxime, nickel complexes of 1-phenyl-4-lauroyl-5-hydroxy-pyrazole, optionally with additional ligands. Commercially available nickel compounds include Lowilite Q84 (2,2'-Thiobis(4-tert-octyl-phenolato))-N-butylamine-Nichel(II) made by Chemtura.

(vi) Sterically hindered amines may be used as UV absorbers and light stabilizers. Sterically hindered amines, for example bis(2,2,6,6-tetramethylpiperidyl)-sebacate, bis-(1, 2,2,6,6-pentamethylpiperidyl)-sebacate, n-butyl-3,5-di-tert-butyl-4-hydroxybenzyl malonic acid bis(1,2,2,6,6-pentamethylpiperidyl) ester, condensation product of 1-hydroxyethyl-2,2,6,6-tetramethyl-4-hydroxy-piperidine and succinic acid, condensation product of N,N'-(2,2,6,6-tetramethylpiperidyl)-hexamethylendiamine and 4-tert-octylamino-2,6-dichloro-1,3,5-s-triazine, tris-(2,2,6,6-tetramethylpiperidyl)-nitrilotriacetate, tetrakis-(2,2,6,6-tetramethyl-4-piperidyl)-1,2,3,4-butane-tetra-carbonic acid, 1,1'(1,2-ethanediyl)-bis-(3,3,5,5-tetramethylpiperazinone). Such amines include hydroxylamines derived from hindered amines, such as di(1-hydroxy-2,2,6,6-tetramethylpiperidin-4-yl)sebacate: 1-hydroxy 2,2,6,6-tetramethyl-4-benzoxypiperidine; 1-hydroxy-2,2,6,6-tetramethyl-4-(3,5-di-tert-butyl-4-hydroxy hydrocinnamoyloxy)-piperidine; and N-(1-hydroxy-2,2,6,6-tetramethyl-piperidin-4-yl)-epsiloncaprolactam. Commercially available hindered amines include Lowilite 19, Lowilite 62, Lowilite 77, Lowilite 92 and Lowilite 94 made by Chemtura.

(vii) Oxalic acid diamides, for examples, 4,4'-dioctyloxy-oxanilide, 2,2'-di-octyloxy-5',5'-di-tert-butyloxanilide, 2,2'-di-dodecyloxy-5',5'di-tert-butyl-oxanilide, 2-ethoxy-2'-ethyl-oxanilide, N,N'-bis(3-dimethylaminopropyl)-oxalamide, 2-ethoxy-5-tert-butyl-2'-ethyloxanilide and its mixture with 2-ethoxy-2'ethyl-5,4-di-tert-butyloxanilide and mixtures of o- and p-methoxy-as well as of o- and p-ethoxy-disubstituted oxanilides.

The polymer resins and phosphite compositions of the invention may also include one or more additional additives, including, for example, one or more of the following:

(i) Metal deactivators, for example, N,N'-diphenyloxalic acid diamide, N-salicylal-N'-salicyloylhydrazine, N,N'-bis-salicyloylhydrazine, N,N'-bis-(3,5-di-tert-butyl-4-hydrophenylpropionyl)-hydrazine, salicyloylamino-1,2,4-triazole, bis-benzyliden-oxalic acid dihydrazide.

(ii) Additional secondary antioxidants such as additional phosphites and/or phosphonites, for example, triphenyl phosphite, diphenylalkyl phosphites, phenyldialkyl phosphites, tris(nonyl-phenyl)phosphite, trilauryl phosphite, trioctadecyl phosphite, distearyl pentaerythritol diphosphite, tris(2,4-di-tert-butylphenyl)phosphite, diisodecyl pentaerythritol diphosphite, bis(2,4-di-tert-butylphenyl)pentaerythritol diphosphite tristearyl sorbitol triphosphite, bis(2,4-dicumylphenyl) pentaerythritol diphosphite, and tetrakis(2,4-di-tert-butylphenyl)-4,4'-biphenylene diphosphonite. Commercially available secondary antioxidants include Naugalube TPP, Alkanox™ 240, Ultranox™ 626, Naugard P, Weston™ 399, Weston TNPP, Weston 430, Weston 618F, Weston 619F, Weston DPDP, Weston DPP, Weston PDDP, Weston PTP, Weston TDP, Weston TLP, Weston TPP, and Weston TLTTP (trilauryl trithio phosphite) made by Chemtura; Doverphos™ 4, Doverphos 4-HR, Doverphos 4-HR Plus, Doverphos HiPure 4, and Doverphos S-9228 made by Dover Chemical; and Hostanox PEPQ made by Clariant Chemicals.

(iii) Peroxide scavengers, for example, esters of betathiodipropionic acid, for example the lauryl, stearyl, myristyl or tridecyl esters, mercaptobenzimidazole or the zinc salt of 2-mercaptobenzimidazole, zinc-dibutyldithiocaramate, dioctadecyldisulfide, pentaerythritoltetrakis-(beta-dodecylmercapto)-propionate.

(iv) Polyamide stabilizers, for example copper salts in combination with iodides and/or phosphorus compounds and salts of divalent manganese may also be included in the polymer resin and/or phosphite composition.

(v) Basic co-stabilizers, for example, melamine, polyvinylpyrrolidone, dicyandiamide, triallyl cyanurate, urea derivatives, hydrazine derivatives, amines, polyamides, polyurethanes, hydrotalcites, alkali metal salts and alkaline earth metal salts of higher fatty acids, for example, Ca stearate, calcium stearoyl lactate, calcium lactate, Zn stearate, Zn octoate, Mg stearate, Na ricinoleate and K palmirate, antimony pyrocatecholate or zinc pyrocatecholate. Commercially available co-stabilizers include Mark™ 6045, Mark 6045ACM, Mark 6055, Mark 6055ACM, Mark 6087ACM, Mark 6102, Mark CE 345, Mark CE 350, and Mark CE 387, made by Chemtura; and DHT-4ATM made by Kisuma Chemicals.

(vi) Nucleating and clarifying agents, for example, metal salts of 4-tert butylbenzoic acid, adipic acid, diphenylacetic acid, sorbitol and derivatives thereof, sodium benzoate, and benzoic acid.

(vii) Aminoxy propanoate derivatives such as methyl-3-(N,N-dibenzylaminoxy)propanoate; ethyl-3-(N,N-dibenzylaminoxy) propanonoate; 1,6-hexamethylene-bis(3-N,N-dibenzylaminoxy)proponoate); methyl-(2-(methyl)-3(N,N-dibenzylaminoxy)propanoate); octadecyl-3-(N,N-dibenzylaminoxy)propanoic acid; tetrakis (N,N-dibenzylaminoxy)ethyl carbonyl oxymethy)methane; octadecyl-3-(N,N-diethylaminoxy)-propanoate; 3-(N,N-dibenzylaminoxy)propanoic acid potassium salt; and 1,6-hexamethylene bis(3-(N-allyl-N-dodecyl aminoxy)propanoate).

(viii) Other additives, for example, plasticizers, lubricants, emulsifiers, pigments, optical brighteners, flameproofing agents, anti-static agents, blowing agents and thiosynergists such as dilaurythiodipropionate or distearylthiodipropionate.

Optionally the polymer or polymeric resins may include from 5-50 wt %, e.g., 10-40 wt % or 15-30 wt % fillers and reinforcing agents, for example, calcium carbonate, silicates, glass fibers, asbestos, talc, kaolin, mica, barium sulfate, metal oxides and hydroxides, carbon black and graphite.

The invention further pertains to a stabilized polymer, wherein one component comprises a liquid phosphite composition of the present invention and the other a polymer, such as a polyolefin, polyvinyl chloride, etc., or polymeric resins.

The polymer stabilized by such liquid phosphite compositions may be any polymer known in the art, such as polyolefin homopolymers and copolymers, thermoplastics, rubbers, polyesters, polyurethanes, polyalkylene terephthalates, polysulfones, polyimides, polyphenylene ethers, styrenic polymers and copolymers, polycarbonates, acrylic polymers, polyamides, polyacetals, halide-containing polymers, and biodegradable polymers. Mixtures of different polymers, such as polyphenylene ether/styrenic resin blends, polyvinyl chloride/ABS or other impact modified polymers, such as methacrylonitrile and α-methylstyrene containing ABS, and polyester/ABS or polycarbonate/ABS and polyester plus some other impact modifier may also be used. Such polymers are available commercially or may be made by means well known in the art. However, the stabilizer compositions of the invention are particularly useful in thermoplastic polymers, such as polyolefins, polycarbonates, polyesters, polyphenylene ethers and styrenic polymers, due to the extreme temperatures at which thermoplastic polymers are often processed and/or used.

The polymers used in combination with liquid phosphite compositions of the present invention are produced using a variety of polymerization processes including solution, high-pressure, slurry and gas phase using various catalysts including Ziegler-Natta, single-site, metallocene or Phillips-type catalysts. Non-limiting polymers useful with the liquid phosphite compositions include ethylene based polymers such as linear low density polyethylene, elastomers, plastomers, high density polyethylene, substantially linear long chain branched polymers, and low density polyethylene; and propylene based polymers such as polypropylene polymers including atactic, isotactic, and syndiotactic polypropylene polymers, and propylene copolymers such as propylene random, block or impact copolymers.

The polymers, typically ethylene based polymers, have a density in the range of from 0.86 g/cc to 0.97 g/cc, preferably in the range of from 0.88 g/cc to 0.965 g/cc, more preferably in the range of from 0.900 g/cc to 0.96 g/cc, even more preferably in the range of from 0.905 g/cc to 0.95 g/cc, yet even more preferably in the range from 0.910 g/cc to 0.940 g/cc, and most preferably greater than 0.915 g/cc, preferably greater than 0.920 g/cc, and most preferably greater than 0.925 g/cc. The polymers produced by the process of the invention typically have a molecular weight distribution, a weight average molecular weight to number average molecular weight (Mw/Mn) of greater than 1.5 to about 15, particularly greater than 2 to about 10, more preferably greater than about 2.2 to less than about 8, even more preferably from about 2.2 to less than 5, and most preferably from 2.5 to 4. The ratio of Mw/Mn can be measured by gel permeation chromatography techniques well known in the art. The polymers of the present invention in one embodiment have a melt index (MI) or (I2) as measured by ASTM-D-1238-E in the range from 0.01 dg/min to 1000 dg/min, more preferably from about 0.01 dg/min to about 100 dg/min, even more preferably from about 0.1 dg/min to about 50 dg/min, and most preferably from about 0.1 dg/min to about 10 dg/min. The polymers of the invention in one embodiment have a melt index ratio (I21/I2) (I21 is measured by ASTM-D-1238-F) of from 10 to less than 25, more preferably from about 15 to less than 25. The polymers of the invention in a preferred embodiment have a melt index ratio (I21/I2) (I21 is measured by ASTM-D-1238-F) of from preferably greater than 25, more preferably greater than 30, even more preferably greater that 40, still even more preferably greater than 50 and most preferably greater than 65.

Polymers used with liquid phosphites compositions of the invention are useful in such forming operations as film, sheet, and fiber extrusion and co-extrusion as well as blow molding, injection molding and rotary molding. Films include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications. Fibers include melt spinning, solution spinning and melt blown fiber operations for use in woven or non-woven form to make filters, diaper fabrics, medical garments, geotextiles, etc. Extruded articles include medical tubing, wire and cable coatings, geomembranes, and pond liners. Molded articles include single and multi-layered constructions in the form of bottles, tanks, large hollow articles, rigid food containers and toys, etc. In addition to the above, the liquid phosphite compositions are used in various rubber based products such as tires, barriers and the like.

In one embodiment, the liquid phosphite compositions are suitable and/or approved for use in polymers, preferably polyolefins, that are used in contact with beverages, foods and other human consumables.

Polymers of monoolefins and diolefins, for example polypropylene, polyisobutylene, polybutene-1, polymethylpentene-1, polyisoprene, or polybutadiene, as well as polymers of cycloolefins, for instance of cyclopentene or norbornene, polyethylene (which optionally can be crosslinked), for example high density polyethylene (HDPE), low density polyethylene (LDPE) and linear low density polyethylene (LLDPE) may be used. Mixtures of these polymers, for example, mixtures of polypropylene with polyisobutylene, polypropylene with polyethylene (for example PP/HDPE, PP/LDPE) and mixtures of different types of polyethylene (for example LDPE/HDPE), may also be used. Also useful are copolymers of monoolefins and diolefins with each other or with other vinyl monomers, such as, for example, ethylene/ propylene, LLDPE and its mixtures with LDPE, propylene/ butene-1, ethylene/hexene, ethylene/ethylpentene, ethylene/ heptene, ethylene/octene, propylene/isobutylene, ethylene/ butene-1, propylene/butadiene, isobutylene, isoprene, ethylene/alkyl acrylates, ethylene/alkyl methacrylates, ethylene/vinyl acetate (EVA) or ethylene/acrylic acid copolymers (EAA) and their salts (ionomers) and terpolymers of ethylene with propylene and a diene, such as hexadiene, dicyclopentadiene or ethylidene-norbornene; as well as mixtures of such copolymers and their mixtures with polymers mentioned above, for example polypropylene/ethylene propylene-copolymers, LDPE/EVA, LDPE/EAA, LLDPE/EVA, and LLDPE/EAA.

The olefin polymers may be produced by, for example, polymerization of olefins in the presence of Ziegler-Natta catalysts optionally on supports such as, for example, $MgCl_2$, chromium 20 salts and complexes thereof, silica, silica-alumina and the like. The olefin polymers may also be produced utilizing chromium catalysts or single site catalysts, e.g., metallocene catalysts such as, for example, cyclopentadiene complexes of metals such as Ti and Zr. As one skilled in the art would readily appreciate, the polyethylene polymers used herein, e.g., LLDPE, can contain various comonomers such as, for example, 1-butene, 1-hexene and 1-octene comonomers.

The polymer may also include styrenic polymers, such as polystyrene, poly-(p-methylstyrene), 5 poly-(α-methylstyrene), copolymers of styrene or α-methylstyrene with dienes or acrylic derivatives, such as, for example, styrene/butadiene (SBR), styrene/acrylonitrile, styrene/alkyl methacrylate, styrene/maleic anhydride, styrene/maleimide, styrene/butadiene/ethyl acrylate, styrene/acrylonitrile/methylacrylate, mixtures of high impact strength from styrene copolymers and another polymer, such as, for example, from a polyacrylate, a diene polymer or an ethylene/propylene/diene terpolymer; and block copolymers of styrene, such as, for example, styrene/butadiene/styrene (SBS), styrene/isoprene/styrene (SIS), styrene/ethylene/butylene/styrene or styrene/ethylene/ propylene/styrene.

Styrenic polymers may additionally or alternatively include graft copolymers of styrene or α-methylstyrene such as, for example, styrene on polybutadiene, styrene on polybutadiene-styrene or polybutadiene-acrylonitrile; styrene and acrylonitrile (or methacrylonitrile) on polybutadiene and copolymers thereof; styrene and maleic anhydride or maleimide on polybutadiene; styrene, acrylonitrile and maleic anhydride or maleimide on polybutadiene; styrene, acrylonitrile and methyl methacrylate on polybutadiene, styrene and alkyl acrylates or methacrylates on polybutadiene, styrene and acrylonitrile on ethylene-propylene-diene terpolymers, styrene and acrylonitrile on polyacrylates or polymethacrylates, styrene and acrylonitrile on acrylate/butadiene copolymers, as well as mixtures thereof with the styrenic copolymers indicated above.

Suitable rubbers include both natural rubber and synthetic rubbers, and combinations thereof. Synthetic rubbers include, but are not limited to, for example, thermoplastic rubbers, ethylene/alpha-olefin/non-conjugated polyene (EPDM) rubbers, ethylene/alpha-olefin (EPR) rubbers, styrene/butadiene rubbers, acrylic rubbers, nitrile rubbers, polyisoprene, polybutadiene, polychloroprene, acrylonitrile/butadiene (NBR) rubbers, polychloroprene rubbers, polybutadiene rubbers, isobutylene-isoprene copolymers, etc. Thermoplastic rubbers include SIS, solution and emulsion SBS, etc.

Nitrile polymers are also useful in the polymer composition of the invention. These include homopolymers and copolymers of acrylonitrile and its analogs, such as polymethacrylonitrile, polyacrylonitrile, acrylonitrile/butadiene polymers, acrylonitrile/alkyl acrylate polymers, acrylonitrile/alkyl methacrylate/butadiene polymers, and various ABS compositions as referred to above in regard to styrenics.

Polymers based on acrylic acids, such as acrylic acid, methacrylic acid, methyl methacrylic acid and ethacrylic acid and esters thereof may also be used. Such polymers include polymethylmethacrylate, and ABS-type graft copolymers wherein all or part of the acrylonitrile-type monomer has been replaced by an acrylic acid ester or an acrylic acid amide. Polymers including other acrylic-type monomers, such as acrolein, methacrolein, acrylamide and methacrylamide may also be used.

Halogen-containing polymers may also be stabilized with the phosphite compositions of the present invention. These include polymers such as polychloroprene, epichlorohydrin homo- and copolymers, polyvinyl chloride, polyvinyl bromide, polyvinyl fluoride, polyvinylidene chloride, chlorinated polyethylene, chlorinated polypropylene, fluorinated polyvinylidene, brominated polyethylene, chlorinated rubber, vinyl chloride-vinyl acetate copolymers, vinyl chloride-ethylene copolymer, vinyl chloride-propylene copolymer, vinyl chloridestyrene copolymer, vinyl chloride-isobutylene copolymer, vinyl chloride-vinylidene chloride copolymer, vinyl chloride-styrene-maleic anhydride terpolymer, vinyl chloride-styrene-acrylonitrile copolymer, vinyl chloridebutadiene copolymer, vinyl chloride isoprene copolymer, vinyl chloride-chlorinated propylene copolymer, vinyl chloride-vinylidene chloride-vinyl acetate terpolymer, vinyl chloride-acrylic acid ester copolymers, vinyl chloride-maleic acid ester copolymers, vinyl chloride-methacrylic acid ester copolymers, vinyl chloride-acrylonitrile copolymer and internally plasticized polyvinyl chloride.

Other useful polymers include homopolymers and copolymers of cyclic ethers, such as polyalkylene glycols, polyethylene oxide, polypropylene oxide or copolymers thereof with bisglycidyl ethers; polyacetals, such as polyoxymethylene and those polyoxymethylene which contain ethylene oxide as a comonomer; polyacetals modified with thermoplastic polyurethanes, acrylates or methacrylonitrile containing ABS; polyphenylene oxides and sulfides, and mixtures of polyphenylene oxides with polystyrene or polyamides; polycarbonates and polyester-carbonates; polysulfones, polyethersulfones and polyetherketones; and polyesters which are derived from dicarboxylic acids and diols and/or from hydroxycarboxylic acids or the corresponding lactones, such as polyethylene terephthalate, polybutylene terephthalate, poly-1,4-dimethylol-cyclohexane terephthalate, poly-2-(2,2,4(4-hydroxyphenyl)-propane) terephthalate and polyhydroxybenzoates as well as block copolyetheresters derived from polyethers having hydroxyl end groups.

Polyamides and copolyamides which are derived from bisamines and dicarboxylic acids and/or from aminocarboxylic acids or the corresponding lactams, such as polyamide 4, polyamide 6, polyamide 6/6, 6/10, 6/9, 6/12 and 4/6, polyamide 11, polyamide 12, aromatic polyamides obtained by condensation of m-xylene bisamine and adipic acid; polyamides prepared from hexamethylene bisamine and isophthalic or/and terephthalic acid and optionally an elastomer as modifier, for example poly-2,4,4 trimethylhexamethylene terephthalamide or poly-m-phenylene isophthalamide may be useful. Further copolymers of the aforementioned polyamides with polyolefins, olefin copolymers, ionomers or chemically bonded or grafted elastomers; or with polyethers, such as for instance, with polyethylene glycol, polypropylene glycol or polytetramethylene glycols and polyamides or copolyamides modified with EPDM or ABS may be used.

In another embodiment, the polymer comprises a biodegradable polymer or compostable polymer. Biodegradable polymers are those in which the degradation results from the action of naturally occurring microorganisms, such as bacteria, fungi and algae. Compostable polymers undergoes degradation by biological processes during composting to yield $CO_2$, water, inorganic compounds and a biomass at a rate consistent with other compostable materials. Typically the biodegradable or compostable polymers are derived from plant sources and are synthetically produced. Examples of biodegradable or compostable polymers include poly(glycolic acid) (PGA), poly(lactic acid) (PLA), and co-polymers thereof. Biodegradable or compostable polymers may also be derived from a blend of starch of a plant and a conventional petroleum-based polymer. For example, the biodegradable polymer may be blended with a polyolefin.

Polyolefin, polyalkylene terephthalate, polyphenylene ether and styrenic polymers, and mixtures thereof are more preferred, with polyethylene, polypropylene, polyethylene terephthalate, polyphenylene ether homopolymers and copolymers, polystyrene, high impact polystyrene, polycarbonates and ABS-type graft copolymers and mixtures thereof being particularly preferred.

In one embodiment, the liquid phosphite compositions are added to stabilize natural and synthetic waxes, such as n-paraffin waxes, chloroparaffins, α-olefin waxes, microcrystalline waxes, polyethylene waxes, amide waxes, and Fisher-Tropsch waxes. These waxes may be suitable for making candles.

The instant stabilizers may readily be incorporated into the polymer by conventional techniques at any convenient stage prior to the manufacture of shaped articles therefrom. For example, the stabilizer may be mixed with the polymer in dry powder form, or a suspension or emulsion of the stabilizer may be mixed with a solution, suspension, or emulsion of the polymer. The stabilized compositions of the invention may optionally also contain from about 0.001 to about 5 wt. %, e.g., from about 0.0025 to about 2 wt. % or from about 0.05 to about 0.25 wt. %, of various conventional additives, such as those described previously, or mixtures thereof.

The stabilizers of this invention advantageously assist with the stabilization of polymer compositions especially in high temperature processing against changes in melt index and/or color, even though the polymer may undergo a number of extrusions. The stabilizers of the present invention may readily be incorporated into the polymer compositions by conventional techniques, at any convenient stage prior to the manufacture of shaped articles therefrom. For example, the stabilizer may be mixed with the polymer in dry powder form, or a suspension or emulsion of the stabilizer may be mixed with a solution, suspension, or emulsion of the polymer.

The compositions of the present invention can be prepared by a variety of methods, such as those involving intimate admixing of the ingredients with any additional materials desired in the formulation. Suitable procedures include solution blending and melt blending. Because of the availability of melt blending equipment in commercial polymer processing facilities, melt processing procedures are generally preferred. Examples of equipment used in such melt compounding methods include: co-rotating and counter-rotating extruders, single screw extruders, disc-pack processors and various other types of extrusion equipment. In some instances, the compounded material exits the extruder through small exit holes in a die and the resulting strands of molten resin are cooled by passing the strands through a water bath. The cooled strands can be chopped into small pellets for packaging and further handling.

All of the ingredients may be added initially to the processing system, or else certain additives may be pre-compounded with each other or with a portion of the polymer or polymeric resin to make a stabilizer concentrate. Moreover, it is also sometimes advantageous to employ at least one vent port to allow venting (either atmospheric or vacuum) of the melt. Those of ordinary skill in the art will be able to adjust blending times and temperatures, as well as component addition location and sequence, without undue additional experimentation.

While the stabilizers of this invention may be conveniently incorporated by conventional techniques into polymers before the fabrication thereof into shaped articles, it is also possible to apply the instant stabilizers by a topical application to the finished articles. Articles may comprise the instant stabilizer compounds and polymers and may be made into, for example, head lamp covers, roofing sheets, telephone covers, aircraft interiors, building interiors, computer and business machine housings, automotive parts, and home appliances. The articles may be made by extrusion, injection molding, roto-molding, compaction, and other methods. This may be particularly useful with fiber applications where the instant stabilizers are applied topically to the fibers, for example, by way of a spin finish during the melt spinning process.

The phosphite compositions of the invention may have uses in addition to polymer stabilization. For example, it may be desirable to react the phosphite composition to form a new derivative product, that may of additional uses. Transesterification processes, for example, such as those disclosed in Hechenbleikner et al., U.S. Pat. No. 3,056,823, which is incorporated herein by reference, may also be employed. Specifically, the process described by Hechenbleikner et al. involves transesterifying a triaryl phosphite with a monohydroxy hydrocarbon in the presence of a small but catalytically effective amount of a metal alcoholate or metal phenolate. To avoid contamination, the alcoholate of the particular alcohol to be transesterified is employed. Instead of employing a preformed alcoholate, the alcoholate can be formed in situ by adding the metal, e.g., sodium, potassium or lithium to the alcohol prior to adding the triaryl phosphite. The mono alcohol and triaryl phosphite are reacted in the mol ratio of three mols of the alcohol to one mol of the triaryl phosphite.

The present invention will now be described by way of the following non-limiting examples.

EXAMPLE 1

Synthesis of Mixed Amyl/Butyl Phenols

Phenol (105 grams, 1.12 moles) and Fulcat 22B catalyst (2.25 grams) were charged to an oil jacketed flask and heated to 130° C. under nitrogen. Isobutylene (64.6 grams, 1.15 moles) was added via a sintered glass frit below the surface of the phenol at a uniform rate over 30 minutes. During addition, the internal temperature rose to 140° C. Once the addition was completed, the reaction mass was held at a jacket temperature of 130° C. for one hour. Amylene (39.2 grams, 0.56 mole) was then added below the surface of the phenolics at a uniform rate over 1.25 hours. After the addition, the reaction mass was held at a jacket temperature of 130° C. for two hours. The reaction was then filtered and the phenolic filtrate collected. The mixed butylated/amylated phenol alkylate was subjected to vacuum distillation to reduce the phenol content to less than 0.25% and the water content to less than 50 ppm. Yield=161.8 grams.

GC analysis identified the following major components: 50.8% 4-t-butyl-phenol, 17.6% 2,4-di-t-butyl-phenol, 15.3% 4-t-amyl-phenol, 10.7% 2-t-amyl-4-t-butyl-phenol and 2-t-butyl-4-t-amyl-phenol, 1.3% 2,4-di-t-amyl-phenol, 1.4% 2-t-butyl-phenol, and 0.3% 2,4,6-tri-t-butyl-phenol.

EXAMPLE 2

Conversion to a Phosphite of the Alkylate Obtained as per Example 1

Mixed butylated/amylated phenolic alkylate (148.7 grams, 0.86 mole) was charged to an oil jacketed flask and heated to 80° C. under nitrogen. $PCl_3$ (35.8 grams, 0.26 mole) was added, below the surface of the phenolics, at a uniform rate over three hours. During the addition, the temperature was ramped to 150° C. The reaction mass was held at 150° C. until HCl evolution ceased, and then was heated to 200° C. over one hour while the pressure was reduced from 1000 to 50 mbar. The reaction was held at 200° C./50 mbar until the total Cl content was less than 50 ppm. The phenolic excess was then removed by distillation under one mbar pressure and an internal temperature of 240° C. (vapor temperature 140° C.). Yield=123.1 grams.

The phosphite composition had kinematic viscosity of @ 30° C. of 8,541 cSt, @ 40° C. of 3,198 cSt, and @ 50° C. of 812 cSt.

EXAMPLE 3

73.4 g (0.53 moles) of phosphorous trichloride and 1.74 ml (6.41 mmols) of N,N-dimethyldodecylamine are charged to a jacketed vessel under nitrogen. The contents of the vessel are agitated and heated to 70° C. Separately, a powdered blend of 193.1 g (1.18 moles) of 4-tert-amylphenol and 121.3 g (0.56 moles) of 2,4-di-tert-butylphenol is prepared. The powdered blend is added in uniform shots of 26.2 g, every 15 minutes over 3 hours. During the addition the reaction is held at 70° C. and evolved HCl is absorbed by a scrubber unit.

Once all the phenols are added, the reaction temperature is uniformly ramped from 70° C. to 150° C. over 1 hour. The reaction mass is held at 150° C. for 1 hour or until the HCl evolution has stopped. Next, the reaction mass is further heated from 150° C. to 200° C. and held for 1 additional hour. Once the reaction mass has reached 200° C., the reaction is degassed by applying a vacuum at a pressure from 60-80 mbar until the total chlorine content is less than 50 ppm. Excess phenols may be removed by distillation under a pressure of 7 mbar up to an internal temperature of 200° C. (maximum vapor temperature 127° C.).

1.89 g (9.9 mmoles) of triisopropanolamine is added to the phosphite composition.

The resulting composition of phosphites had a kinematic viscosity at 70° C. of 97 cSt. The total phosphorous content is 5.6%.

EXAMPLE 4

A 1:1 molar ratio of 2-t-butyl-p-cresol and 4-t-amylphenol were charged to an oil jacketed flask and heated to 80° C. under nitrogen. $PCl_3$ (73.4 grams, 0.53 mole) was added, below the surface of the phenolics, at a uniform rate over 2 hours. During the addition the temperature was ramped to 150° C. and the reaction mass was held at 150° C. until HCl evolution ceased. Next the reaction mass was heated to over 200° C. over 1 hour while the pressure was reduced from 1000 to 70 mbar, and held at these conditions until the total Cl content was less than 50 ppm. The phenolic excess was then removed by distillation under 8 mbar pressure and an internal temperature of 200° C. The resulting composition of phosphites had a kinematic viscosity at 70° C. of 160 cSt. The total phosphorous content is 5.9%.

EXAMPLE 5

The composition of phosphites from Examples 3 and 4 were tested and compared against a tris(nonylphenyl)phosphite, Weston 399, and showed the following results in Table 3. The phosphite were added at the same phosphorous content for comparison (@ 17 ppm).

TABLE 3

| Composition | Example 3 | Example 4 | Weston 399 |
|---|---|---|---|
| LLDPE | 99.93 wt % | 99.901 wt % | 99.89 wt % |
| ZnSt | 0.05 wt % | 0.05 wt % | 0.05 wt % |
| Anox PP18 | 0.02 wt % | 0.02 wt % | 0.02 wt % |
| Phosphite Amount | 0.0305 wt % | 0.029 wt % | 0.04 wt % |
| YI (ASTM E313) during multipass @ 230° C. | | | |
| Initial | −1.284 | −1.07 | −1.249 |
| Pass 1 | 0.441 | 0.573 | 0.06 |

TABLE 3-continued

| Composition | Example 3 | Example 4 | Weston 399 |
|---|---|---|---|
| Pass 3 | 0.705 | 0.952 | 0.718 |
| Pass 5 | 0.937 | 1.689 | 1.203 |
| MFI @ 2.16 kg during multipass @ 230° C. | | | |
| Initial | 0.975 | 0.958 | 0.967 |
| Pass 1 | 0.939 | 0.909 | 0.904 |
| Pass 3 | 0.782 | 0.781 | 0.778 |
| Pass 5 | 0.591 | 0.629 | 0.637 |
| MFI @ 21.6 kg during multipass @ 230° C. | | | |
| Initial | 23.635 | 22.817 | 23.027 |
| Pass 1 | 23.203 | 22.986 | 23.066 |
| Pass 3 | 22.022 | 21.656 | 21.614 |
| Pass 5 | 21.344 | 20.694 | 20.973 |
| MFI ratio during multipass @ 230° C. | | | |
| Initial | 24.229 | 23.814 | 23.819 |
| Pass 1 | 24.698 | 25.298 | 25.519 |
| Pass 3 | 28.149 | 27.741 | 27.765 |
| Pass 5 | 36.113 | 32.894 | 32.940 |
| YI, after NOx exposure | | | |
| 2 hours | 2.37 | 2.84 | 3.26 |
| 25 hours | 5.48 | 8.33 | 6.27 |
| 94 hours | 8.63 | 9.14 | 9.34 |
| 120 hours | 9.41 | 9.94 | 10.11 |
| 140 hours | 10.19 | — | 10.52 |

EXAMPLES 6

Preparation of phosphite composition from a 1:1 (Molar) mixture of 4-t-amylphenol (4-TAP) with 2,4-di-t-butylphenol (2,4-DTBP) was prepared similar to Example 3. Viscosities are provided in Table 4, below.

COMPARATIVE EXAMPLE A

Reaction of phosphorus trichloride (⅓ mole) with 2,4-di-tertiary amyl phenol (⅔ mole) then with 2,4-ditertiary butyl phenol (⅓ mole) from U.S. Pat. No. 5,254,709 produces a solid phosphite composition.

One-third of a mole of phosphorus trichloride (46 g) was charged into a 500 ml 3-neck flask. One hundred cubic centimeters of toluene and 0.2 g mercaptobenzothiazole were added. Then 156 g (⅔ mole) of melted 2,4-di-tertiary amyl phenol was dropped in over a period of two hours, the temperature being maintained between 550 and 65° C. The temperature was then increased to 120°-123° C. for two hours. Nitrogen gas was passed through the hot mix to remove residual hydrogen chloride. The mix stood over the weekend at room temperature. An infrared analysis showed no hydroxyl. The mixture was warmed to 60° C. and 68.3 g (⅓ mole) of solid 2,4-di-tertiary butyl phenol was added. The mix was gradually heated to 127° C. (over two hours) and then heated near that temperature for three hours longer. Nitrogen gas was bubbled through the hot mix to remove residual hydrogen chloride. The toluene was removed by heating under diminished pressure. The residual product was a clear liquid that hardened to a clear glassy product on cooling. Three hundred cc of methanol was added and the mixture was stirred and heated to 60° C. The product gradually crystallized to a white powder. After standing in the methanol at room temperature overnight the solid product was filtered off and washed with 100 cc of methanol. The dried produce weighed 197.6 g (90% of theory). The material melted at 890-93° C.

COMPARATIVE EXAMPLES B AND C

Comparative Examples B and C were prepared in a similar amount with different molar ratios of phenols and different phenols as shown in Table 4 below. Comparative Examples B and C use 4-t-butylphenol (4-TBP).

TABLE 4

| | | | | | | Viscosities (cSt) | | |
|---|---|---|---|---|---|---|---|---|
| Ex. | Phenol 1 | Mol | Phenol 2 | Mol | Ratio | @ 40° C. | @ 50° C. | @ 60° C. |
| 3 | 2,4-DTBP | 0.293 | 4-TAP | 0.588 | 1:2 | 1189 | 420 | 175 |
| 6 | 2,4-DTBP | 0.288 | 4-TAP | 0.288 | 1:1 | 32,228 | 7351 | 1810 |
| B | 2,4-DTBP | 0.661 | 4-TBP | 0.661 | 1:1 | — | 10,265 | 1678 |
| C | 2,4-DTBP | 2.938 | 4-TBP | 5.878 | 1:2 | 10,486 | 1853 | — |

As shown in Table 4, replacing 4-TBP with 4-TAP reduces the viscosity at lower temperatures, 30-50° C. In addition, providing a molar ratio of 2,4-DTBP to 4-TAP of 1:2 further reduces the viscosity.

In view of the many changes and modifications that can be made without departing from principles underlying the invention, reference should be made to the appended claims for an understanding of the scope of the protection to be afforded the invention.

What is claimed is:

1. A composition comprising a mixture consisting of at least two different alkylaryl phosphites having the structure:

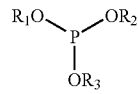

wherein $R_1$, $R_2$ and $R_3$ are independently selected alkylated aryl groups of the structure:

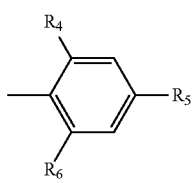

wherein $R_4$ is selected from the group consisting of hydrogen, t-butyl and t-amyl; $R_5$ is selected from the group consisting of t-butyl and t-amyl; and $R_6$ is hydrogen, wherein at least one of the alkylaryl phosphites has two or more alkyl groups having a different number of carbon atoms on different aryl moieties, and wherein the mixture consisting of at least two different alkylaryl phosphites is a liquid at ambient conditions and is a reaction product of a phosphorous trihalide and a mixture of 2,4-di-t-amyl phenol and 4-t-butyl phenol, in a molar ratio of 1:4 to 4:1.

2. A composition comprising a mixture consisting of at least two different alkylaryl phosphites having the structure:

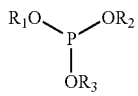

wherein $R_1$, $R_2$, and $R_3$ are independently selected alkylated aryl groups of the structure:

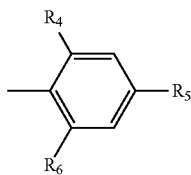

wherein $R_4$ is selected from the group consisting of hydrogen, t-butyl and t-amyl; $R_5$ is selected from the group consisting of t-butyl and t-amyl; and $R_6$ is hydrogen, wherein at least one of the alkylaryl phosphites has two or more alkyl groups having a different number of carbon atoms on different aryl moieties, and wherein the mixture consisting of at least two different alkylaryl phosphites is a liquid at ambient conditions and is a reaction product of a phosphorous trihalide and a mixture of 4-t-butyl phenol and either 4-t-amyl phenol or 2,4-di-t-amyl phenol, in a molar ratio of 1:4 to 4:1.

3. A composition comprising a mixture consisting of at least two different alkylaryl phosphites having the structure:

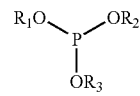

wherein $R_1$, $R_2$, and $R_3$ are independently selected alkylated aryl groups of the structure:

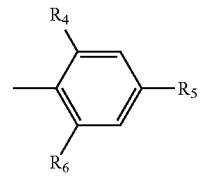

wherein $R_4$ is selected from the group consisting of hydrogen, t-butyl and t-amyl; $R_5$ is selected from the group consisting of t-butyl and t-amyl; and $R_6$ is hydrogen wherein at least one of the alkylaryl phosphites has two or more alkyl groups having a different number of carbon atoms on different aryl moieties, and wherein the mixture consisting of at least two different alkylaryl phosphites is a liquid at ambient conditions and is a reaction product of a phosphorous trihalide and a mixture of 4-t-amyl phenol and either 4-t-butyl phenol or 2,4-di-t-butyl phenol, in a molar ratio of 1:4 to 4:1.

\* \* \* \* \*